United States Patent
Hirsh et al.

(10) Patent No.: US 8,255,080 B2
(45) Date of Patent: Aug. 28, 2012

(54) DIGITAL CONTENT DISTRIBUTION SYSTEM

(75) Inventors: Murray Hanavi Hirsh, Montreal (CA); Daniel Bernesi, Île Bizard (CA)

(73) Assignee: Hermes Promethean Ventures Inc., Nassau (BS)

( * ) Notice: Subject to any disclaimer, the term of this patent is extended or adjusted under 35 U.S.C. 154(b) by 318 days.

(21) Appl. No.: 12/676,402

(22) PCT Filed: Sep. 4, 2008

(86) PCT No.: PCT/CA2008/001555
§ 371 (c)(1),
(2), (4) Date: Apr. 14, 2010

(87) PCT Pub. No.: WO2009/030023
PCT Pub. Date: Mar. 12, 2009

(65) Prior Publication Data
US 2010/0211217 A1    Aug. 19, 2010

Related U.S. Application Data

(60) Provisional application No. 60/967,241, filed on Sep. 4, 2007, provisional application No. 60/967,242, filed on Sep. 4, 2007, provisional application No. 60/967,243, filed on Sep. 4, 2007, provisional application No. 60/967,244, filed on Sep. 4, 2007.

(51) Int. Cl.
*G06F 17/00* (2006.01)
(52) U.S. Cl. ........ 700/242; 700/231; 700/232; 700/236; 700/243

(58) Field of Classification Search .................. 700/231, 700/232, 236, 242, 243
See application file for complete search history.

(56) References Cited

U.S. PATENT DOCUMENTS

| | | | |
|---|---|---|---|
| 5,699,328 A * | 12/1997 | Ishizaki et al. | 700/231 |
| 5,748,485 A * | 5/1998 | Christiansen et al. | 700/234 |
| 5,953,504 A * | 9/1999 | Sokal et al. | 709/227 |
| 6,381,513 B1 | 4/2002 | Takase et al. | |
| 6,571,150 B2 * | 5/2003 | Arai et al. | 700/236 |
| 6,594,548 B2 | 7/2003 | Bagnordi | |
| 6,748,296 B2 * | 6/2004 | Banerjee et al. | 700/241 |
| 6,748,539 B1 | 6/2004 | Lotspiech | |
| 6,957,746 B2 | 10/2005 | Martin et al. | |
| 7,000,144 B2 | 2/2006 | Takata | |
| 7,191,346 B2 | 3/2007 | Abe et al. | |
| 7,209,893 B2 | 4/2007 | Nii | |
| 7,216,228 B2 | 5/2007 | Sako et al. | |
| 7,234,609 B2 | 6/2007 | DeLazzer et al. | |
| 7,660,767 B1 * | 2/2010 | Schultz et al. | 700/235 |
| RE41,543 E * | 8/2010 | Satchell et al. | 700/232 |
| 2005/0094822 A1 | 5/2005 | Swartz | |
| 2005/0228821 A1 | 10/2005 | Gold | |

* cited by examiner

*Primary Examiner* — Timothy Waggoner
(74) *Attorney, Agent, or Firm* — Brouillette & Partners; François Cartier; Robert Brouillette

(57) ABSTRACT

This invention provides an improved method to deliver large amounts of digital content to portable electronic devices at low cost, without requiring the users of such devices to download such content from the Internet. Neither do the users have to purchase or manipulate data storage media such as CDs, DVDs, or memory cards. Moreover, the digital content delivery system of this invention can facilitate digital rights management, a major concern of content publishers.

12 Claims, 10 Drawing Sheets

DIGITAL CONTENT DISTRIBUTION SYSTEM

CROSS-REFERENCE TO RELATED APPLICATIONS

This application claims the benefit of U.S. Provisional Applications No. 60/967,241 entitled "Data delivery system", No. 60/967,242 "Data storage Unit", No. 60/967,243 entitled "Electronic module" and No. 60/967,244 entitled "Electronic module receptacle", all filed to the United States Patent and Trademark Office on Sep. 4, 2007, by Hanavi Murray Hirsh and Daniel Bernesi and incorporated by reference herein.

FIELD OF THE INVENTION

This invention is in the field of systems that deliver data to electronic devices. More specifically, the field concerns systems that deliver digital content (DC) such as text, audio, images, video, and games to personal electronic devices (PEDs).

BACKGROUND OF THE INVENTION

Useful, affordable electronic devices that present DC to the user in the form of text, audio, image, video and games are available to almost everyone in wealthy countries and to a significant portion of the population in countries where money is scarce for most.

Users of PEDs that present DC want to easily acquire fresh content for their own use. A personal computer with a connection to the Internet is most often used for this purpose. Under the heading of digital rights management (DRM), various methods have been proposed to ensure that those who are the owners of copyrighted material get paid by those who consume it. Examples can be found in U.S. Pat. No. 7,191,346 issued to Abe et al. on Mar. 13, 2007 entitled "Data transfer system, data transfer apparatus, data recording apparatus, edit controlling method and data processing method" and U.S. Pat. No. 7,000,144 issued to Takata on Feb. 14, 2006 entitled "Information management apparatus, information management system, and information management software". In some such methods, specially prepared recording media are used to receive the downloaded DC, as is taught in U.S. Pat. No. 7,216,228 issued to Sako et al. on May 8, 2007 entitled "Recording medium recording and/or reproduction apparatus, recording and/or reproduction method".

Not everyone who has an electronic device used to play DC, however, has a computer at home or even ready access to one elsewhere. Among those who do, many do not have an Internet connection with the capacity to download the desired quantities of DC. Moreover, some Internet service providers impose a surcharge if the amount of data received exceeds the monthly amount that is allowed for in the subscription contract.

Some methods of automated DC distribution provide a vending machine that offers DC such as video on standard media, such as DVDs, that are ready for use at home and in portable DVD players. Vending machines that offer an assortment of titles of DC preloaded on storage media may be more convenient for some than, for instance, using the Internet to download films, but the owners of such vending machines must contend with restocking them together with the cost and security issues that arise when physical inventory is stored, shipped and handled. The security issues are addressed in U.S. Pat. No. 7,234,609 issued to DeLazzer et al. on Jun. 26, 2007 entitled "Article dispensing system and method for same". The choice of titles available in such a vending system, however, is clearly quite limited.

To serve those who, for the reasons previously stated, are not prepared to download DC via a home Internet connection, a variety of other methods are described in previous art to provide DC to users for use in their PEDs. One alternative means to update DC is to download it to the device in question via a direct or indirect connection to the Internet at a point-of-sale kiosk or terminal that provides such a connection, usually in exchange for direct or indirect payment. An example of such known art is taught by U.S. Pat. No. 6,594,548 issued to Bagnordi on Jul. 15, 2003 entitled "Portable digital assistant" that describes a vending machine that downloads DC to a customer's attached PED or to a memory card that can be used in such a device using a variety of different electrical connectors to suit different PEDs and memory modules.

U.S. Pat. No. 6,748,539 issued to Lotspiech on Jun. 8, 2004 entitled "System and method for securely checking in and checking out digitized content" describes a method that provides for the controlled rental of DC by means of a system that employs a vending machine that copies desired DC onto a flash memory device that the consumer will use in his DC player. That same machine is used to receive the same memory card when it is returned after the rental period has ended. A method in the same area, and likewise addressing concerns for DRM, is taught by U.S. Pat. No. 7,209,893 issued to Nii on Apr. 24, 2007 entitled "Method and a system for distributing electronic content" in which a second means is used to receive codes on a multimedia cell phone that will unlock access to certain portions of the DC on a memory card inserted into the cell phone. The user has previously downloaded DC into that same memory card via a personal computer connected to the Internet.

Another limitation of some automated methods of distributing DC is the length of time that it takes to load a large quantity of DC onto a flash memory device or other form of data storage such as an optical disk. If implemented in a public area kiosk or vending machine, such inefficient methods cannot be used by large numbers of people each hour.

Moreover, the use of easily duplicated standard storage media to deliver copyrighted digital content is of great concern to content publishers. Despite the existence of laws in some jurisdictions that forbid the creation or use of methods that overcome copyright protection technologies, such methods are widely available. The same kind of high-level skills that are used by some to develop encryption means and content locking schemes are used by others to devise way to defeat such security measures.

Many other methods known to previous art store DC on a local or remote computer and transfer the DC to magnetic, optical or electronic storage media that the user must then insert into his electronic device.

U.S. Pat. No. 6,381,513 issued to Takase, et al. on Apr. 30, 2002 entitled "Electronic information distributing terminal equipment" proposes a vending machine that enables consumers to purchase a memory card, with the most commonly desired content being available from a stock of such cards. The method of content distribution taught by Takase shares two other disadvantages that constrain all known methods that use a vending machine to dispense standard memory cards.

The proliferation of different memory card format in the market is an issue that makes the implementation of such a system very difficult, as different card formats must be maintained to satisfy the market.

A second constraint follows from the need, as stated in the Takase patent, for the machine to read user information from a memory card that the user must first insert into the machine and then must write user information to the memory card that will be distributed. In a high traffic context where users will be waiting in line to use the machine, the two steps add time to the process that can seriously constrain efficiency and reduce user satisfaction.

Summary of the Disadvantages of the Known Art of Automated Digital Content Distribution (a) Methods that download DC by means of a personal computer are of no use to those who do not use a computer or who find it inconvenient to do so.
(b) Because, in many locations in the world, a high-speed connection to the Internet is not available, and even where it is available, it may be unaffordable to many, methods that require the use of high-speed Internet are of no help to many people who want to acquire DC.
(c) Methods that require the distribution of physical media to kiosks or vending machines incur significant costs.
(d) Methods that require purchasers of DC at a vending machine or kiosk to wait while an automated or attended means is used to load digital content onto physical media or to a PED are impractical for DC that is large in size, such as films, as the significant wait time will be an inconvenience to the DC purchasers and will constrain the number of purchasers who can be served each day.
(e) Vending machine that dispenses memory modules have been proposed that maintain a stock of memory modules with preloaded content to avoid requiring purchasers to wait, and require the purchaser to insert a "used" card. Because there is no one kind of memory module that is universally used, it will be very difficult to handle the variety of memory module formats that must be maintained for each specific selection of digital content that is in high demand. The vending machine's internal handling of such varied media is highly problematic, as different kinds are of different size and have differently placed contacts. In effect, there needs to be different slots to insert the different card types, and there must be a different handling mechanism for each.
(f) Proposed vending machine methods that dispense memory cards, must read user data from the card that is inserted by the user and write user data to the second card that is dispensed, adding significant time to the process
(g) Many devices that play music or video do not use easily removable memory modules.
(h) Methods that use standard physical media, despite the use of sophisticated means to encrypt the DC and lock access to it, are vulnerable to the unauthorized copying of the DC they contain.

Many DC consumers would accordingly prefer a system that: is as simple as possible to use; requires neither an Internet connection nor the handling of storage media; and would enable them to very quickly load their PED with large amounts of DC and use that PED to deliver DC to many other players.

OBJECTS OF THE INVENTION

The objects of the present invention therefore are:
(a) to provide an automated digital content delivery system (DCDS) whose efficiency and security will benefit both the owners of such content and its consumers;
(b) to provide a DCDS that makes accessible all manner of DC to the many people who either do not have the benefit of a high-speed connection to the Internet or who may have such access but would prefer a more convenient and less costly way to access DC;
(c) to provide a DCDS that is able to deliver DC so quickly and at such low cost that a single DC dispensing terminal can serve large numbers of people each hour, and can be used to deliver content that heretofore has not been widely distributed in digital form;
(d) to provide a DCDS that makes available in an economical and practical way DC that may be of interest only to a small minority of people, or only to people in one location.
(e) to provide a DCDS that will be a practical means to deliver educational materials at low cost.

In brief, our invention provides an automated flow of DC from the content publishers to local terminals which consumers will use to load the DC they want into their PEDs.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

Accordingly, the present invention provides a network of digital content dispensing terminals (DCDTs) that are each in a location that is conveniently accessible to many DC consumers. The DCDTs communicate with at least one remote digital content server (RDCS) that, in turn, communicates with DC publishers' servers (DCPSs) that are the source of the DC that the DCDS delivers to those who bring their compatible PEDs to a local DCDT. The DCDTs, through their connection to the RDCS, have ready access to huge libraries of DC. Each DCDT thereby receives updates to the DC it contains as well as rarely requested DC that a particular user has specially ordered.

First Basic Element: Digital Content Dispensing Terminal

The digital content dispensing terminal (DCDT), one of the three innovative basic elements of the present invention, accordingly overcomes the inefficiency and high cost of known art in this field. It can deliver the full contents of a metropolitan newspaper, or a full-length feature film in HDTV video format—or both at the same time to the same person—to 300 or more people per hour.

Those who employ the DCDS of the present invention in a DC distribution business will be in a very strong competitive position in the larger retail DC market, as both capital cost and operating costs are very low. The DCDT takes up little space in a retail location or public area, and there are virtually no ongoing costs related to the purchase of physical media. Moreover, the costs associated with the manufacture, distribution and merchandising of digital content that is delivered on paper, CDs, DVDs, etc. are completely eliminated.

Second Basic Element: Electronic Memory Module

Within each DCDT is an inventory of specially designed electronic memory modules (EMMs) that are the second basic element of the present invention that distinguishes it from the known art. Each EMM can store a large amount of digital content. In its first implementation, the DCDS of the present invention employs EMMs whose capacity may range approximately from 1 GB to 48 GB. Although it shares some of the characteristics of known, commonly used flash memory cards, the EMM's special design enables it to be retrieved by the dispensing terminal from a specific position in its storage system and then be automatically inserted into a receptacle within a PED that has been designed to accept it, all in a few seconds. The EMM incorporates design features that make it difficult for the user to remove without dismantling the PED.

EMMs stored in the DCDT will generally be preloaded with the DC that is most likely to be desired by those who use a particular DCDT. The DCDT will contain many EMMs preloaded with the same, very popular DC. Fewer copies, or only a single EMM, will be held in DCDT inventory in the case of DC that is less in demand. EMMs can, however, be loaded with desired DC "on the fly" while in the DCDT, and users may order special DC, either while they are at the DCDT or at another location.

As the EMMs with very popular DC are dispensed to users, the DCDT's inventory of such DC will begin to be depleted. Additional EMMs will then be prepared with that same DC, in readiness for loading into PEDs brought by others.

Third Basic Element: Digital Storage Unit: a Purpose-Built PED

The DCDT is designed to receive a compatible digital storage unit (DSU), a purpose-built PED, in one or more docking cradles. The DSU is the third, innovative basic element of the DCDS of the present invention. It contains within it one or more EMMs of the kind that are stored in large number in the DCDT. The DSU can feed the DC stored on the EMMs that are contained within it to compatible digital content presentation devices (DCPUs) as well as to all kinds of standard players of audio, video and text content.

Interoperation of the DCDT, EMM and DSU: Recycling EMMs

When a DSU designed for this system is mounted in a special cradle in the DCDT, the DCDT instantly recognizes the DSU's unique identity code and quickly and automatically replaces one or more of the EMMs contained in the DSU with EMMs that are taken from the DCDT's EMM inventory. The EMMs that are automatically inserted contain the DC that the user has previously selected or subscribed to. That selection can be made either: by using the DSU if it is an embodiment that incorporates a user interface similar to those that are found in MP3 players; while the user is at the DCDT using a DCDT user interface; or remotely, choosing from a variety of other automated interactive systems that will be linked to the DCDS, such as a website or a telephone-accessed automated system.

Before the DCDT inserts a new EMM into a DSU, the EMM that had previously been contained securely in that position within the DSU has been removed by the DCDT, and is retained within it. In many instances, the DCDT will subsequently load fresh DC into that EMM.

The operation of our invention is inherently faster than previously proposed DC vending methods because there is no need to read user information from the EMM being returned, and there is no need to write user data to the new EMM that is automatically installed. The process of exchanging one EMM with another therefore takes only a few seconds. The DCDT thereby always retains its full complement of EMMs, and only needs to be physically restocked if some of the recuperated EMMs are found to be defective.

Updating the DC Stored within a DCDT

In addition to the EMMs that it contains as physical inventory within it, the DCDT maintains a much greater variety of DC on an internal, random-access mass storage system (MSS). The MSS will receive updates to its DC from at least one RDCS by an appropriate data communications method chosen from those well known to the art, with that means being chosen to suit local conditions. That method may entail: wired data communications; wireless data communications; and/or the physical delivery of data storage modules. Each DCDT, wherever it is located, can, by one of these ways, receive the specific DC that is requested by its patrons—those who bring their DSUs to it.

Accordingly, the present invention provides an automated and secure method to very quickly load DC selected by a user into a pocket-sized DSU that has been mounted in a DCDT, choosing from content that is centrally managed and is distributed to the network of DCDTs by location-appropriate conventional methods of data communication.

There is no need for the user to handle memory cards, and there is no need for the DCDT, as is the case with previous art in this field, to try to predict what format of memory card, and in what quantity, must be prepared in advance. The DSU, with its standard, purpose-built modules, is designed to feed DC to a vast choice of devices.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel Digital Content Distribution System will be described hereinafter. Although the invention is described in terms of specific illustrative embodiment(s), it is to be understood that the embodiment(s) described herein are by way of example only and that the scope of the invention is not intended to be limited thereby.

Figure 1:
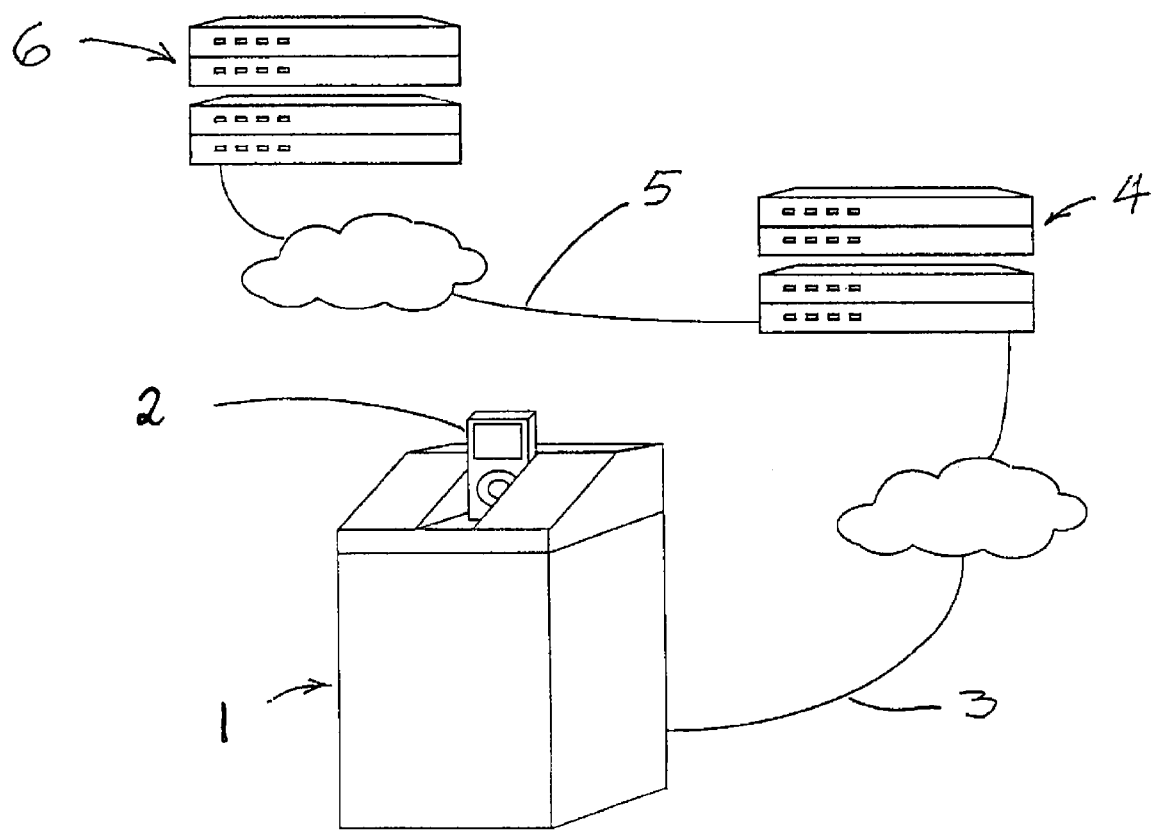
FIG. 1 is a pictorial diagram showing the principle elements of the digital content delivery system (DCDS) of the present invention.

FIG. 1 shows the different elements that comprise an embodiment of the digital content delivery service (DCDS) of the present invention. DCDT 1 is representative of a network of such terminals. DSU 2 is mounted in DCDT 1 to be loaded with DC. DCDT 1 uses first data communication mechanism 3 to send and receive data to/from service operation management data servers 4. Data servers 4 communicate by second data communication mechanism 5 with a plurality of third-party service provider servers 6 (only one group of such servers is shown).

In operation, DCTD 1 replaces one or more EMMs (not shown) contained within DSU 2 with EMMs retrieved from the EMM inventory (not shown) contained within DCDT 1. In particular, the data received is largely in the form of digital content and user account information, and the data sent is user order, payment and usage information. Servers 6 are operated by publishers and distributors of digital content as well as providers of financial services.

Figure 2:
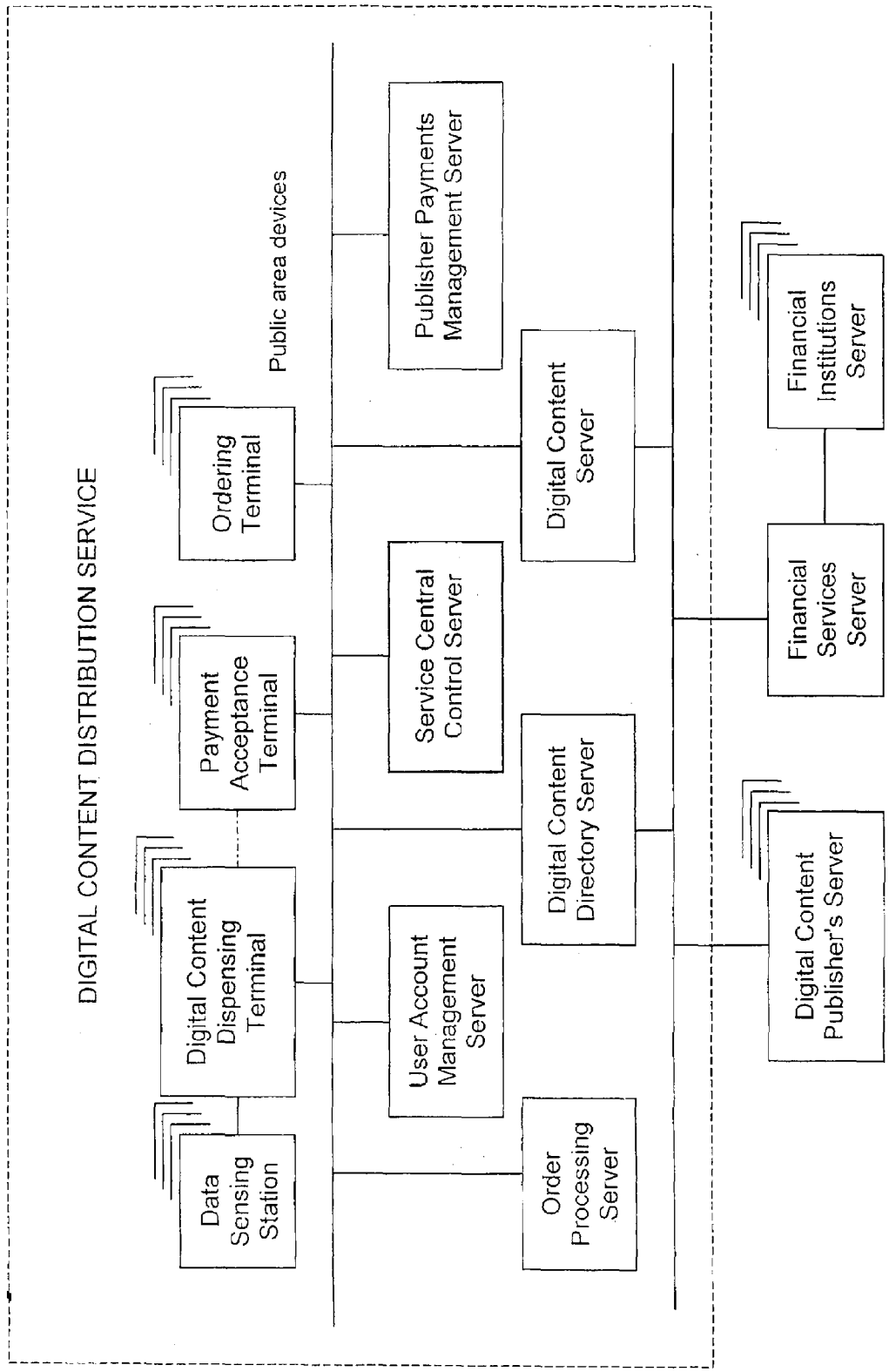
FIG. 2 is a block diagram depicting the various elements that interact to provide the functions of the DCDS of the present invention.

FIG. 2 is a block diagram that shows the three levels of the interoperating elements that comprise the DCDS: public area units that are used by the consumers of the DC provided by the DCDS; computer servers that manage all aspects of the DCDS; and servers operated by third-party providers of digital content and financial services, with those servers communicating with the DCDS servers.

Figure 3:
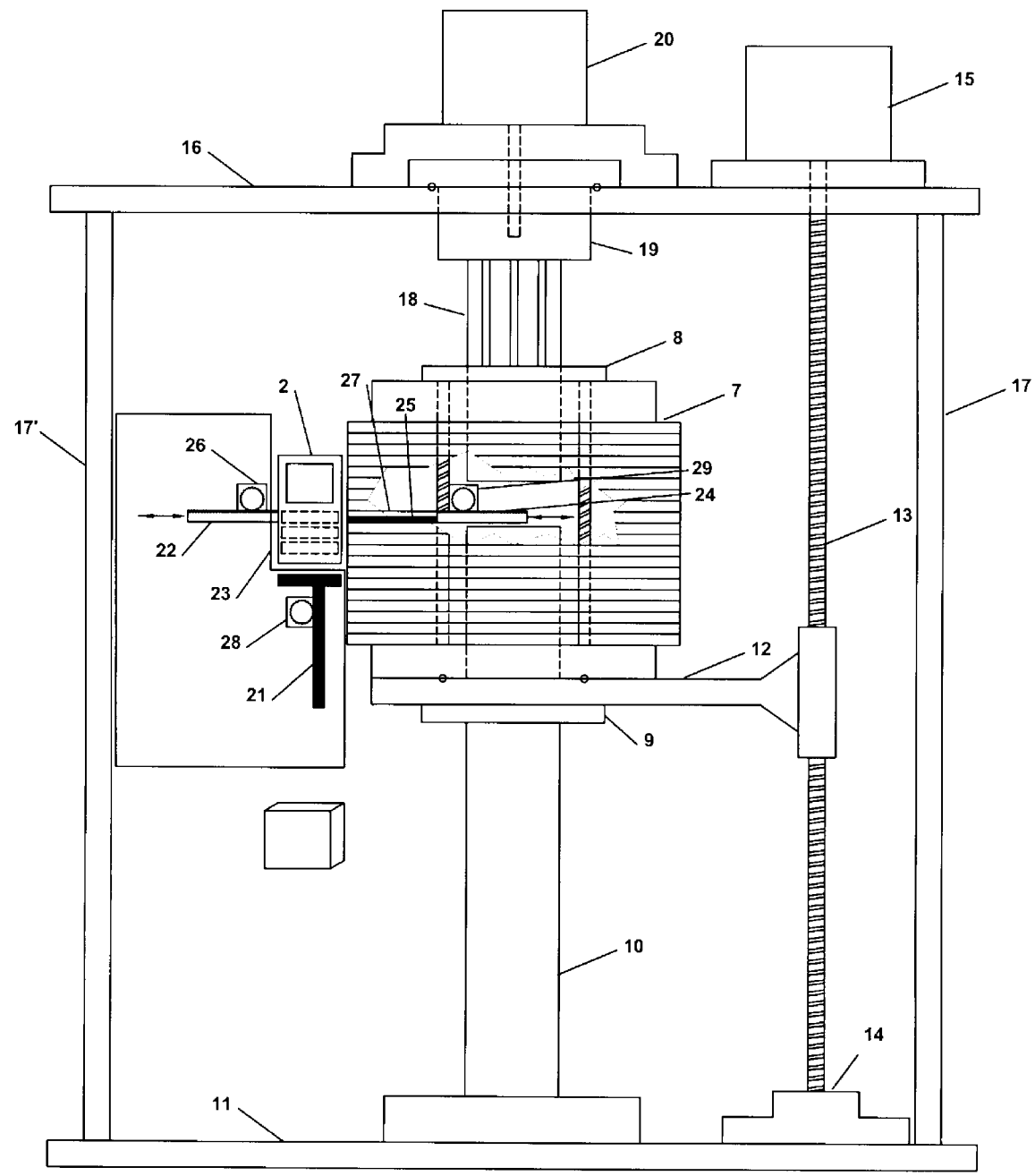
FIG. 3 is an elevation view of the interior of one embodiment of a digital content dispensing terminal, showing its principle mechanical elements.

FIG. 3 is an elevation view of the interior of one possible embodiment of DCDT 1 that shows its principle structural and mechanical elements.

Storage array 7 is fixed to array support cylinder 8 that is open at its bottom and covered at its top by an annular top plate portion that is penetrated by arbor 18. Support cylinder 8 is provided with openings that correspond with the openings of storage array 7 that face the hollow core of the array. Arbor 18 is provided with axial grooves that slidingly engage projections provided on the circular opening of support cylinder 8's top annular plate. Arbor 18 thereby guides the vertical movement of support cylinder 8, and storage array 7 which is attached to it, while communicating rotational movement thereto. Arbor 18 is controllably rotated by first array servo motor 20 that is mounted on top plate 16.

Support cylinder 8 is supported rotatably by flange 9 which is attached to arm 12. Rotatable threaded shaft 13 passes through and engages a threaded portion of arm 12, thereby raising and lowering arm 12 as shaft 13 is controllably rotated by second array servo motor 15 that is mounted on top plate 16. Top plate 16 is supported at each of its corners by vertical members 17 that are attached to base plate 11.

As support cylinder 8 is raised and lowered by the movement of arm 12, its vertical movement is further guided by flange 9 that is in sliding contact with the smooth cylindrical surface of post 10. The flanged end of post 10 is fixed to base plate 11.

The vertical movement of array support cylinder 8 is further guided by its sliding contact along arbor 18.

DSU 2 is mounted in cradle assembly 21. Cradle assembly 21 is controllably raised and lowered by vertical displacement mechanism 28 whereby chosen memory module receptacle 23 can be aligned with exterior pusher mechanism 22 which is mounted on a support member (not shown) that is disposed in a fixed position in the DCDT. The controlled actions of first array servo motor 20 and second array servo motor 15 will align chosen cell 27 of storage array 7 with exterior pusher mechanism 22, thereby enabling exterior pusher mechanism 22 actuated by exterior pusher servo motor 26 to controllably move EMM 25 into array chosen cell 27.

To load a memory module into DSU 2, a new array chosen cell 27, with that cell containing a memory module with the desired digital content, is brought into alignment by the controlled actions of first array servo motor 20 and second array stepper motor 15 with interior pusher mechanism 24 which is fixed to the top of post 10 and is thereby fixedly aligned with apposite exterior pusher mechanism 22. Interior pusher mechanism 24, actuated by interior servo motor 29, will then move EMM 25 from its initial position in array chosen cell 27 into chosen module receptacle 23.

Figure 4:
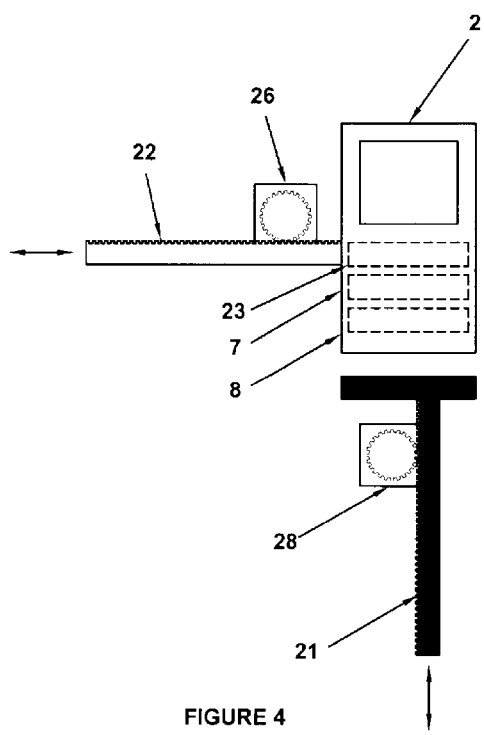
FIG. 4 is an elevation view showing in more detail the mechanical elements interior to the terminal that eject a memory card from a receptacle in a DSU, transferring it to a cell in the terminal storage array.

FIG. 4 is an enlarged elevation view showing DSU 2 being held in cradle assembly 21. Vertical displacement mechanism 28 adjusts the position of cradle assemble 21 to align chosen module receptacle 23 with array chosen cell 27. As soon as chosen module receptacle 23 and array chosen cell 27 have been moved into alignment with each other, interior pusher mechanism 24 actuated by interior pusher servo motor 29 will push EMM 25 located in array chosen cell 27 into chosen module receptacle 23.

Figure 5:
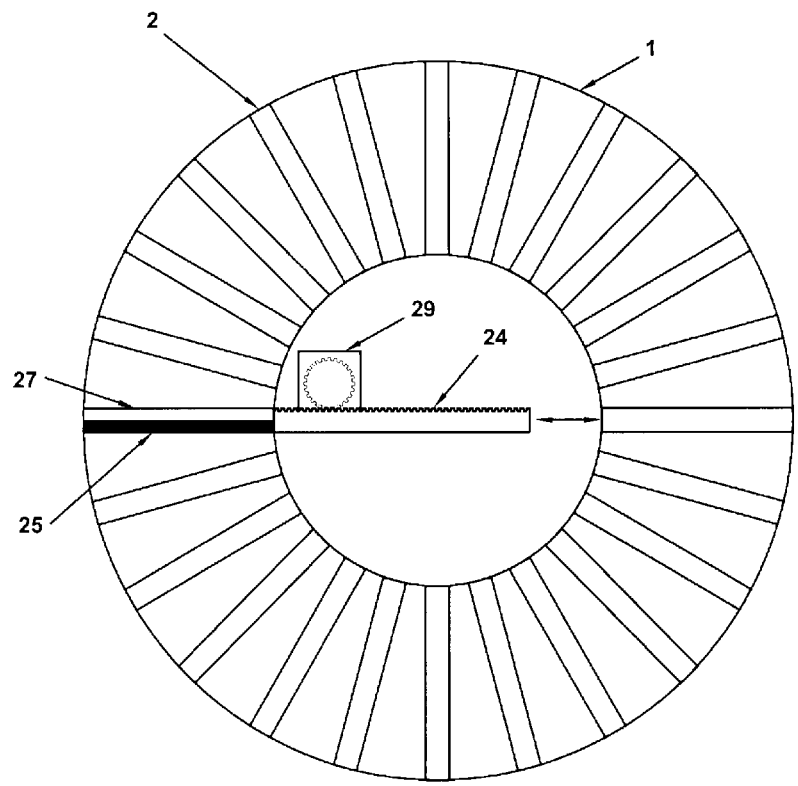
FIG. 5 is a plan view showing in more detail the mechanical elements interior to the terminal that eject a memory card from a cell in the terminal's storage array, transferring it to a receptacle in a DSU.

FIG. 5 is an enlarged plan view of storage array 7 that shows how interior pusher assembly 24 actuated by interior pusher servo motor 29 will move memory module 25 from array chosen cell 27 to chosen module receptacle 23 in the DSU 2 that is mounted in cradle assembly 21.

Figure 6:
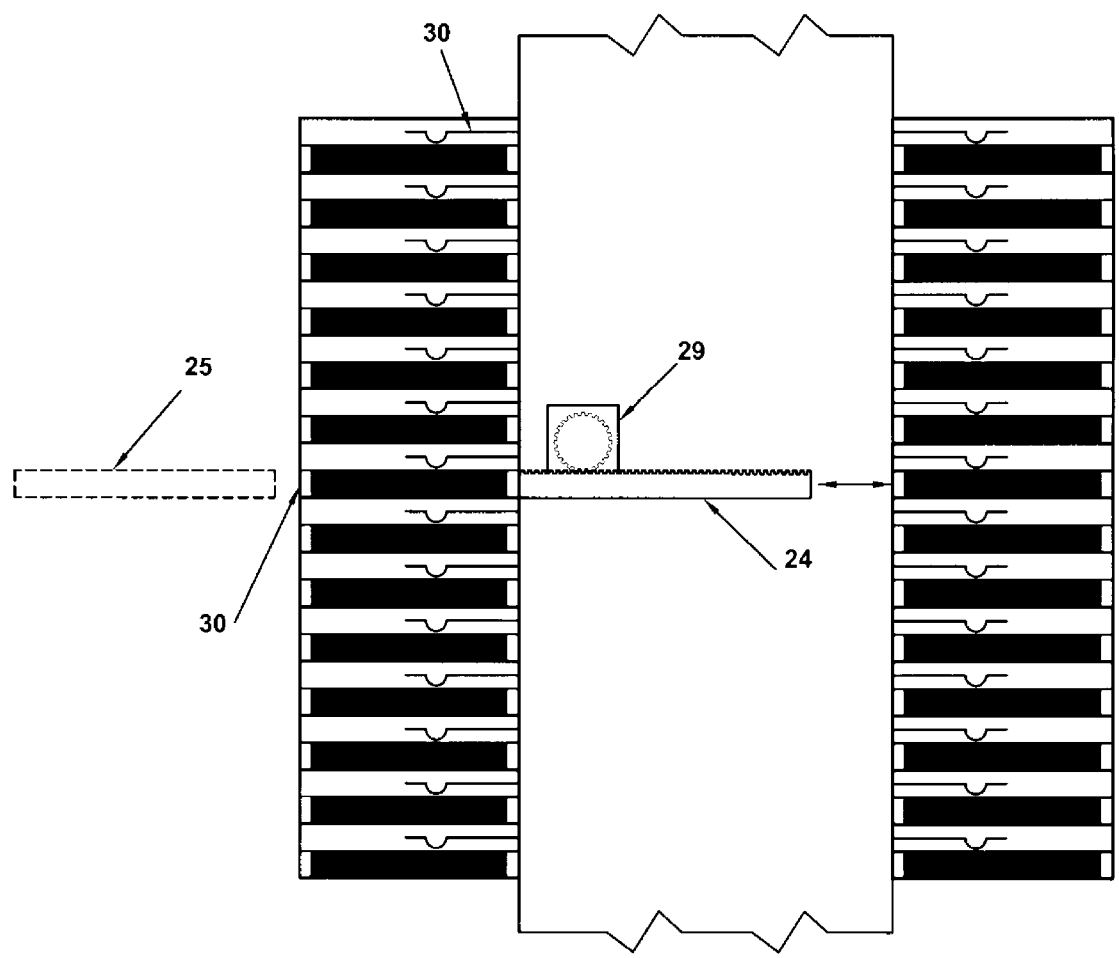
FIG. 6 is, shows in cross section an elevation view of the storage array within the terminal.

FIG. 6 is an elevation view in cross section of storage array 7 that shows EMMs in each cell, with those EMMs being connected to the I/O interface of the central computer (not shown) via springably mounted electrical contacts 30.

Figure 7:
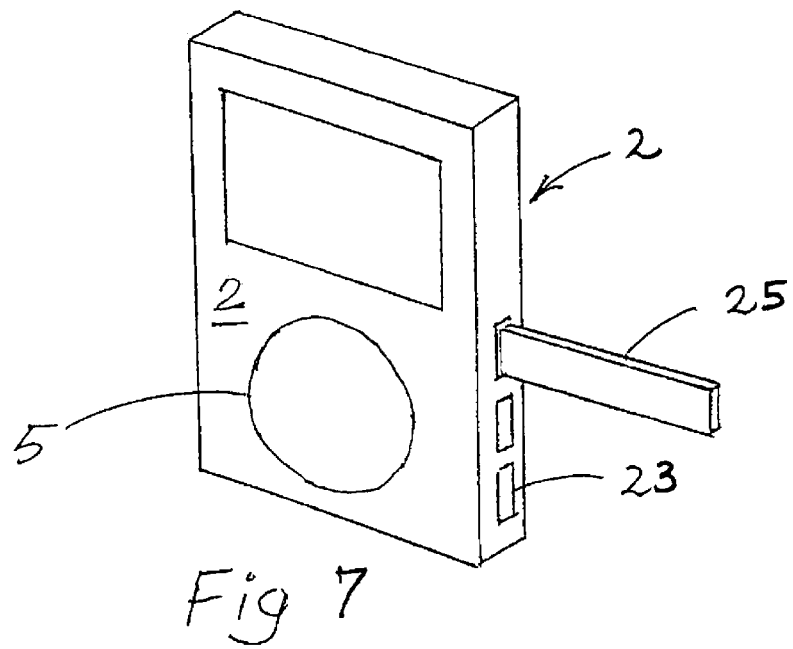
FIG. 7 is a pictorial view of a first embodiment of the DSU.

FIG. 7 is a pictorial view of a first embodiment of DSU 2 that shows EMM 25 in the process of being inserted into module receptacle 23 while DSU 2 is mounted in the DCDT (not shown). Covers that normally cover openings to module receptacles 23 are not shown.

Figure 8:
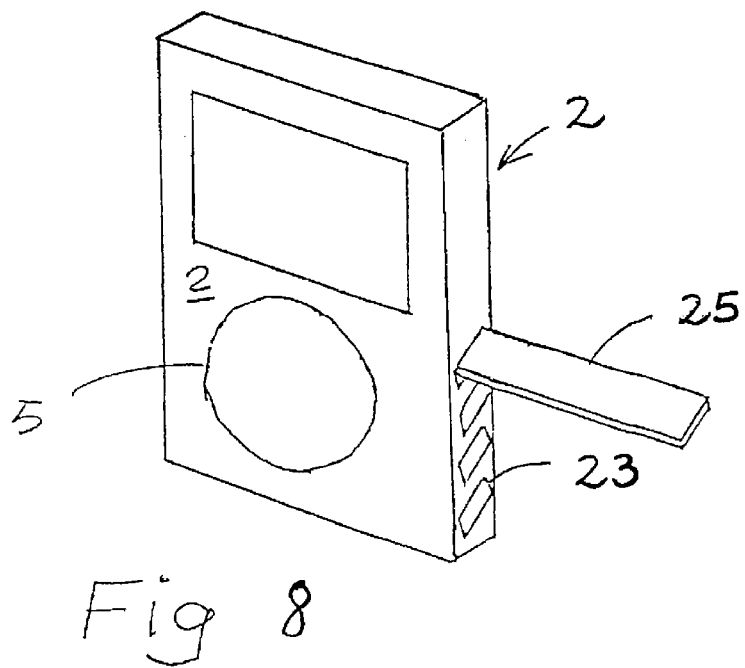
FIG. 8 is a pictorial view of a second embodiment of the DSU.

FIG. 8 is a pictorial view of a second embodiment of DSU 2 that shows EMM 25 in the process of being inserted into module receptacle 23 while DSU 2 is mounted in DCDT 1 (not shown). Covers that normally cover openings to module receptacles 23 are not shown.

Figure 9:
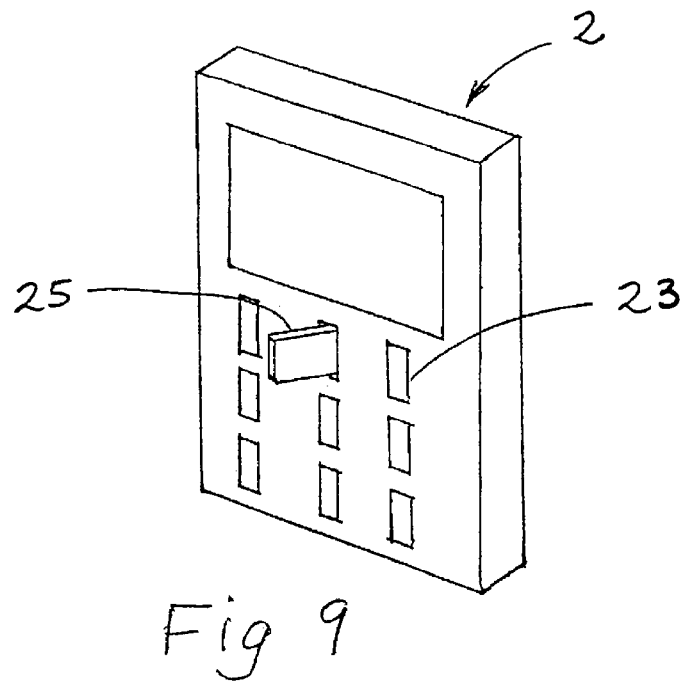
FIG. 9 is a pictorial view of a third embodiment of the DSU.

FIG. 9 is a pictorial view of a third embodiment of DSU 2 that shows EMM 25 in the process of being inserted into module receptacle 23 while DSU 2 is mounted in DCDT 1 (not shown). Covers that normally cover openings to module receptacles 23 are not shown.

Figure 10:
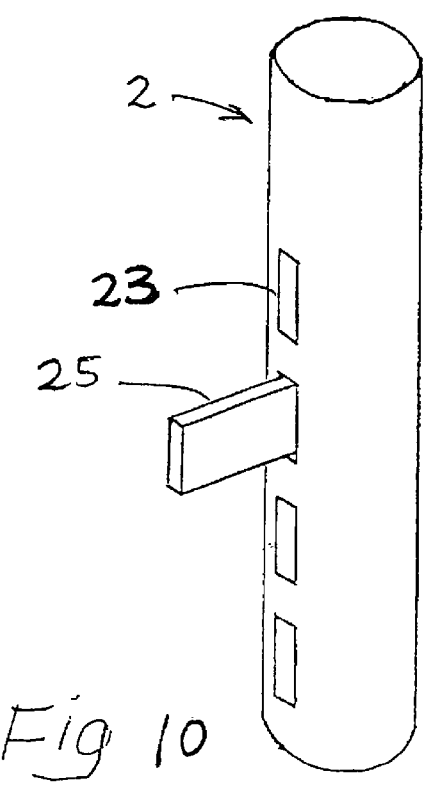
FIG. 10 is a pictorial view of a fourth embodiment of the DSU.

FIG. 10 is a pictorial view of a fourth embodiment of DSU 2 that shows EMM 25 in the process of being inserted into module receptacle 23 while DSU 2 is mounted in the DCDT 1 (not shown). Covers that normally cover openings to module receptacles 23 are not shown.

Figure 11A:
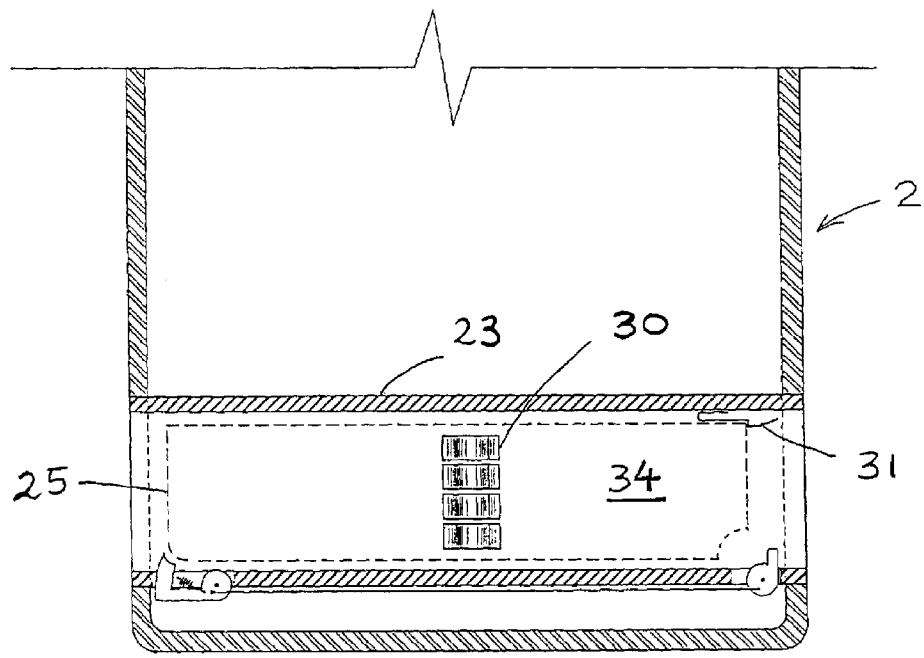
FIG. 11A is a cross sectional view of a DSU, showing the receptacle within it that is designed to receive an EMM.

FIG. 11A is a cross sectional view of an embodiment of DSU 2 which may be used with a DCDT provided with an exterior pusher/puller mechanism, and with no interior pusher mechanism in the central core of the storage array.

Receptacle contacts 30 are attached to receptacle wall 31. Retaining spring 32 prevents the backward movement of EMM 25 once it has been fully inserted into module receptacle 23 by a pusher/puller mechanism (not shown).

In this embodiment, the pusher/puller mechanism (not shown) is always inserted from a first end of module receptacle 23 within DSU 2, pushing EMM 25 within it into a first chosen cell 27 (not shown). The pusher/puller mechanism remains in receptacle 23 as storage array 7 (not shown) is repositioned so that the pusher/puller faces a second chosen cell 27 (not shown) containing a second EMM 25, one that contains the desired DC. The pusher/puller advances to make contact with the EMM, and attachment means in the form of an electromagnet in the tip of the pusher/puller is activated whereby the EMM becomes firmly attached to the pusher/puller which is then withdrawn from receptacle 23, pulling attached EMM 25 with it. As soon as the EMM 25 is properly positioned in receptacle 23, the electromagnet is deactivated and DSU 2 can be removed from cradle 21 (not shown).

Figure 11B:
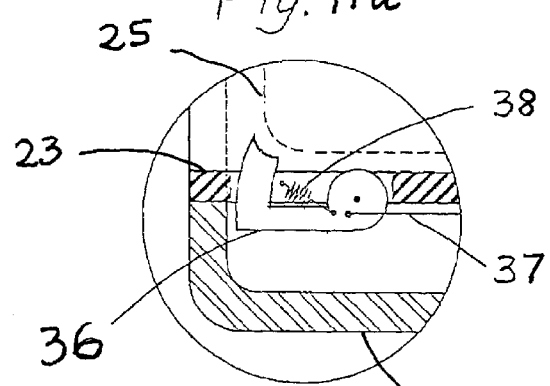
FIG. 11B is a partial cross sectional view of a DSU showing in detail the exit end of the EMM receptacle contained within it.

FIG. 11B is a partial enlarged cross sectional view of the exit end of module receptacle 23 contained within this particular embodiment of DSU 2. Pivotable, travel-limiting stop 31 is normally kept in the position shown by return spring 34 to impede the exit of memory module 25 that is shown in outline. Stop 31 can be pivoted to clear the path of memory module 25 by link 32.

Figure 11C:
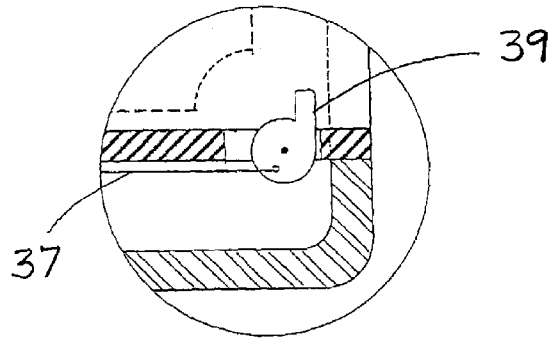
FIG. 11C is a partial cross sectional view of a DSU showing in detail the entry end of the EMM receptacle contained within it.

FIG. 11C is a partial enlarged cross sectional view of the memory module entrance end of receptacle 23 within DSU 2. Pivotable finger 33 is normally in the position shown which is in the path of a pusher/puller (not shown) when it is being inserted while DSU 2 is mounted in DCDT 1. The entry of the pusher/puller (not shown) will cause the rotation of finger 33, pulling and displacing link 32. The movement of link 32 causes the rotation of stop 31 at the exit end of receptacle 23, allowing EMM 25 which is being pushed by the pusher/puller to exit the receptacle.

Figure 12:
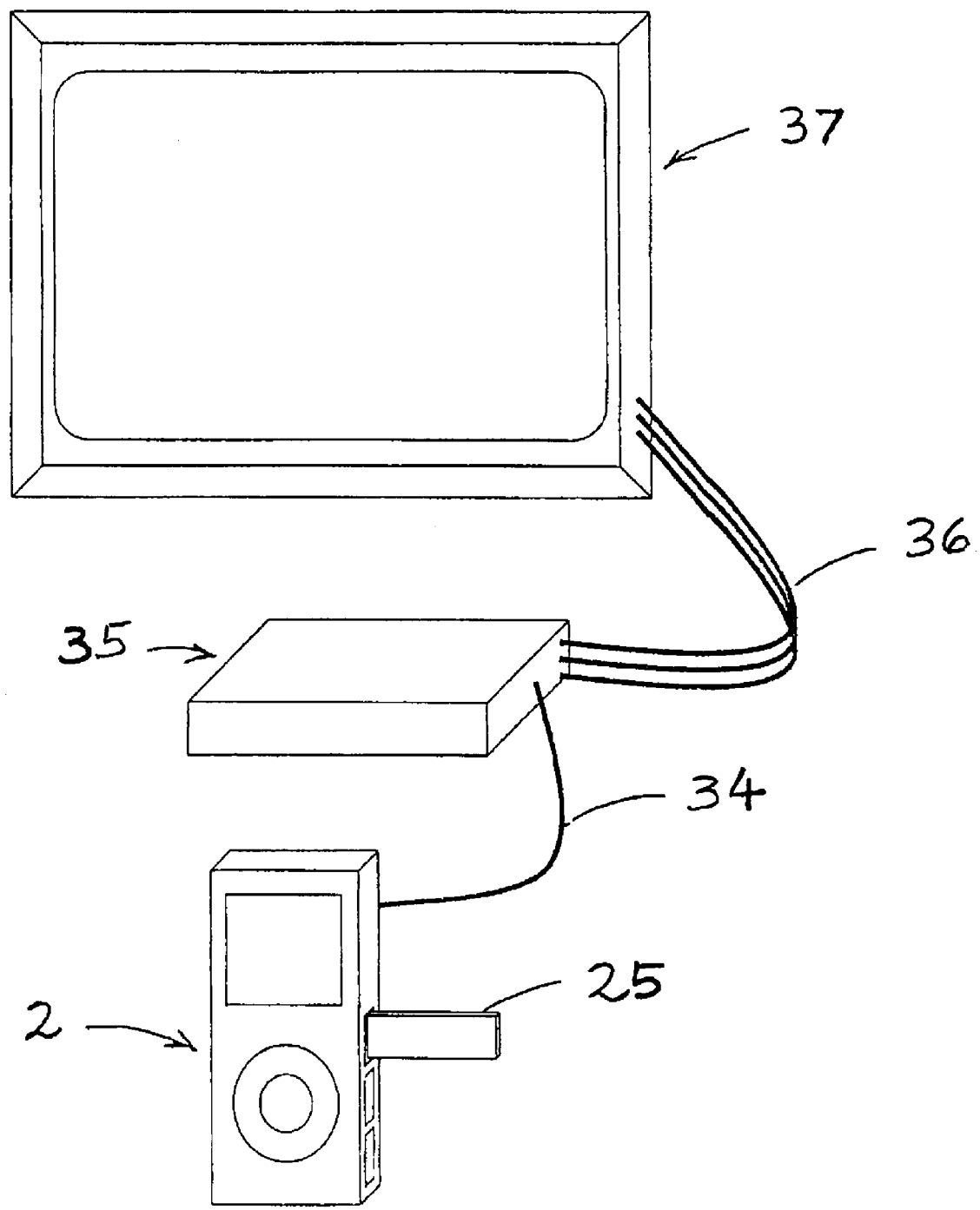
FIG. 12 is a diagram that shows how the DSU can be used as the source of DC for a video.

FIG. 12 is a diagram that shows how DSU 2 can be used as the source of DC for a video player. DSU 2 is connected by data communication link 34 to DCPU 35 that, in the case of the specific embodiment shown for illustrative purposes, functions as a video content decoder that sends the decoded audio and video signals by means of cables 36 to television 37.

Figure 13A:
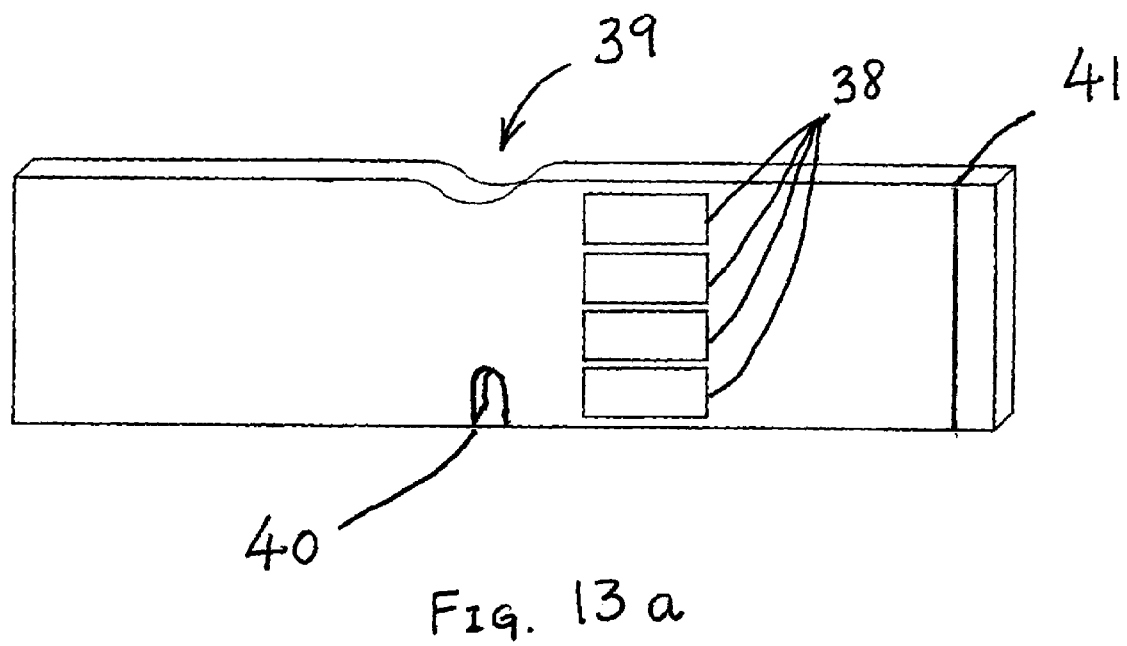
FIG. 13 a and b show a pictorial view of two embodiments of the EMM.
Figure 13B:
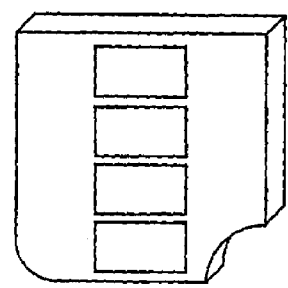

FIG. 13 shows a pictorial view of one embodiment of the EMM. EMM electrical contacts 38 are shown, in this embodiment, on one of the broad faces of EMM 25. Detent 39 will receive a spring-loaded positioning member when EMM 25 is in the correct, fully loaded position in a storage array cell or receptacle 23 of DSU 2. (both not shown). Notch 40 will receive a spring-loaded locking pin when EMM 25 is properly positioned with receptacle 23 of DSU 2. (DSU, receptacle and locking pin not shown) At the end of EMM 25 that may be in contact with a pusher/puller mechanism (not shown) is ferromagnetic strip 41.

Further Description of the EMM and Some of its Other Possible Embodiments
Intended Function The EMM of this invention is designed to be rapidly inserted by an automatic system into an electronic device that presents digital content, or into a device that can directly or indirectly feed or transfer such digital content to a presentation device. The EMMs of this invention make possible a replacement method that is foolproof, convenient, and virtually instantaneous.

EMMs are Always Hidden

The EMMs, as used in the DCDS of this invention, will never be visible to the user. They are either securely stored within a DSU, behind covers that only open when the DSU is positioned in the DCDT, or are stored within the DCDT.

Physical Form

In one preferred embodiment, the EMM of this invention is in the form of a memory stick: a flat strip, substantially 5 cm long, 1 cm wide and 0.3 cm in thick. On one of its broad, rectangular faces is a set of electrical terminals in the form of flat, conductive contacts whose positions match those of corresponding spring-loaded electrical terminals disposed on one inner wall of a receptacle internal to the DSU that is designed to hold the EMM.

When an EMM is stored within one of the individual compartments designed for that purpose within the DCDT, its terminals may, in all cells or in a proportion of those cells, likewise be in electrically conductive contact with terminals in the compartment that connect the EMM within it with a computerized system that can copy fresh DC to it and, in some embodiments, also read certain data portions of an EMM.

FIG. 13 shows a preferred embodiment of the EMM 25 of this invention in which electrical signal connections are provided by row of terminals 38 embedded in one of its broad faces such that they are smoothly even with the surface of that face.

Precisely Positioning the EMM

A preferred embodiment of the EMM will provide a positioning mechanism in the form of at least one indentation, shown in FIG. 13 as detent 39, with that indentation or indentations being disposed in a position either on a longitudinal edge, as shown, or on the obverse face of the EMM that is directly behind the row of electrical contacts 38 on the opposite face. When the EMM has been fully advanced into the receptacle, the indentation receives a similarly curved convex portion of spring-loaded member fixed to the wall of the receptacle.

In some embodiments, a groove positioned along a longitudinal axis of the EMM relieves the surface of the face of the EMM where the indentation is disposed, except in the area of the detent and the proximate smooth rise and cresting of the surface leading up from the bottom of the groove to the start of that indentation. The groove provides for minimal friction between the EMM and the receptacle until the EMM very nearly arrives at its fully inserted position, as until that point clearance is maintained between the tip of the spring-loaded member and the relieved surface of the EMM. Once the EMM has advanced to the position in which the spring-loaded member is resting in detent 39, the spring force of the positioning member presses the EMM against the opposite wall of the receptacle. If that opposite wall is the location of the receptacle electrical contacts, this pressure will ensuring good electrical contact between the two sets of terminals.

Secure Locking Means

The EMM, in the preferred embodiment shown in FIG. 13, provides a locking mechanism in the form of notch 40 along one of the long edges of the EMM that receives a movable, spring-loaded locking element that is disposed in a corresponding location of the EMM-holding receptacle that is contained within the DSU, with that locking element being inserted by spring force means into notch 40 once the EMM has been fully installed. Before the EMM can be removed from the receptacle, the locking element must first be withdrawn, and that can only occur when the DCDT applies controllable magnetic force that acts upon the locking pin mechanism within the DSU that is mounted in the DCDT cradle.

Multiple EMMs in One Receptacle

In yet another embodiment of the EMM, its length, for example, may be one-fifth the length of the receptacle that receives it. This allows five identical modules to be contained within that receptacle. In that embodiment of the receptacle, there are five sets of electrical contacts to make it possible for the data contained within all five modules to be accessed. When a new module is inserted at the entry end of the receptacle, the "oldest" module will be ejected from the exit opening. In some embodiments of this kind, the DSU cradle 21 will be revolved to receive a new EMM next to the "newest" of the four remaining in the receptacle.

More Sophisticated Functionality Provided in Some Embodiments

While the principle function of an EMM is to provide electronic data storage, in some embodiments the EMM will also incorporate a microcontroller and stored programmed instructions to provide for more sophisticated functionality such as data decryption.

Using Standard Memory Cards Instead of the Purpose-Built EMMs

The use of standard electronic memory cards in the DSU is feasible, but the replacement of such cards by the DCDT will be slower and require more complex manipulation within the DCDT than will be the case for the purpose-built EMMs that are designed to easily slide into the DSU receptacle.

Detailed Description of the DSU and its Use

The DSU

The most basic form of a DSU comprises:
a) at least one receptacle designed to receive an EMM;
b) a machine-readable identity code;
c) at least one data output mechanism;

In addition to the elements listed above, many DSU embodiments will also incorporate the following additional elements:
d) at least one device state indicator;
e) a microcontroller IC with associated semiconductor memory to hold programmed instructions and data;
f) at least one user interface mechanism;
g) at least one data input mechanism;

The Utility of the DPU: a Source of DC for a DCPU

The DSU will, in most applications, communicate the DC that it holds to a digital content presentation unit (DCPU) by means of wireless or wired data communications. The DCPU will, if required, decode the digital content that is received from the DSU for presentation principally on a screen, audio speakers or both, depending on the nature of the content that may be text, images, audio, or video. A printer is another form of DCPU, one that presents text and/or images on paper.

A Simplified DSU

In other embodiments, a particular DCPU such as a video decoder with built-in display screen, may incorporate a simplified DSU as an integral component to eliminate the need for connection to a separate DSU. The stripped-down DSU used in this application only needs to have: one or more EMM receptacles; DSU machine-readable identity means; and a data connector or wireless communications means. In such a device, the DSU may be in the form of a removable component that has the same dimensions as a stand-alone DSU so that it can interoperate with the same DCDT that is used with stand-alone DSUs.

Another application will see the DSU connect to, or communicate with, a DCPU docking station. Alternatively, a simplified DSU, as described above, may be incorporated into a DCPU docking station.

Different Physical Forms of the DSU

The DSU must fit into the docking cradle in the DCDT that receives it. The DSU designs that are shown as examples in FIG. 7 through FIG. 10 will require specially designed EMMs, a special docking cradle in the DCDT, and a special EMM handling system incorporated into the DCDT. A singe DCDT may be designed to accommodate more than one form of DSU as well as more than one form of EMM.

Adding "Search EMM Contents Directory and Select" Functionality to the DSU or DCPU In some embodiments, either the DSU or the DCPU that interoperates with it (or both devices) may include a user interface mechanism such as a display screen and touch-operated controls that will enable the user to browse menus of available DC and select which DC stored in an EMM installed in the DSU will be presented. Such methods have been well developed by the designers of widely used personal music players.

In some embodiments and applications, such an interface mechanism may enable the user to also select a preferred way in which that content will be presented by the DCPU, such as the size of the text that will be presented on a display screen or the volume at which audio content will be played.

Those menus may also, in some embodiments and contexts, include DC that is available elsewhere, such as in the particular DCDT that is patronized by the user or in a RDCS that can communicate the desired DC to the DCDT so that it can loaded the next time that the user's DSU is inserted into that DCDT.

Variations of the DSU: Adapting Different Kinds of PED

In some embodiments, the DSU will incorporate some DCPU functionality, such as the ability to decode and present MP3 sound files. Other, more elaborate DSU embodiments will include a character display, a graphical video display, or both. Still further embodiments will incorporate a radio or television tuner, or a satellite signal receiver, to access and play content from radio and TV program broadcast services with the possibility of selectively recording such programming, storing that DC acquired in this way on the EMM for future playback.

In summary, among the many kinds of PED that deliver DC to the user and that can usefully be adapted for use in the DCDS of this invention are: multi-function PDAs and cellular telephones; portable TVs and DVD players; personal music and audio-book players; e-book readers; and devices that combine two or more such functions. In every such case, either DCDT-compatible form must be maintained or else a removable, stripped-down DSU module must be incorporated.

In the following paragraphs, "DSU" for "digital storage unit" could therefore be replaced by "PED" to include the variety of portable electronic devices listed above that can be adapted to become an element of the data delivery system of this invention.

Protection for EMMs Held within the DSU

In the preferred embodiments, the openings on either side of the DSU that give access to the EMMs in their receptacles are normally covered, with the EMMs being inaccessible, protected from the environment, and securely locked in place. The DCDT has an EMM unlocking mechanism that uncovers the openings of the DSU held in its cradle that releases the EMMs so that they can be replaced.

Unique Identity Code and its Use

Each DSU (or other form of PED used) will carry a unique identity code (ID) that can be read by the DCDT. Some examples of ID code mechanisms are: bar codes or another form of machine-readable graphics on the outside; or, in one preferred embodiment, a built-in RFID tag or other form of electronic machine-readable identity code.

If the user is a subscriber to a particular digital content service, or if the user has ordered special DC via a DC ordering system that communicates such order information to the DCDT, the DCDT will, upon reading the ID of the DSU that the user has inserted into it, be able to select the appropriate EMM in its internal inventory that will then be used to replace an EMM that is at that point installed in the DSU. This is accomplished by the DCDT maintaining a database of DC that has been ordered by users who frequent that DCDT. In the case of a DSU not in that database that is brought to it by a user, the DCDT will use data communications means to query the remote user account management server (UAMS). The DSU unique identity, will, in some embodiments, indicate the "home location" of that DSU. In an embodiment in which multiple UAMSs are employed, this will enable the DCDT to query the UAMS that maintains data for the users who are associated with that home location Non-Removable Internal Memory within the DSU The DSU, the DCPU, both devices, or a combined DSU/DCPU, will in some embodiments include internal memory (IM) that is not replaceable by the DCDT, either in the form of flash memory or equivalent electronic memory, or in the form of a disc drive.

The user may be able to transfer selected portions of DC from an EMM to another EMM, to the IM of the DSU, or to the IM of the DCPU that receives DC from the DSU. In some embodiments and for some types of DC, selection of portions of DC for presentation, or transfer of selected DC to IM (either of which may entail decryption of the DC) can only be effected by the user after payment for that DC portion has been confirmed, with that confirmation being received by the DSU, either directly or indirectly, from a user account management server (UAMS).

Preview Presentation Mode

To enable content selection by the user before she or he commits to effecting a payment, a "preview mode" will, in some embodiments of the DCU or DCPU, first present a lower quality version of the DC, or a sample thereof (e.g. an excerpt from a song).

Using the DSU to Select and Order DC

In some other embodiments and applications, the user will use an interactive user interface mechanism built into the DSU, that may comprise key-press controls or a touch-screen means, to "order" the desired DC before inserting the DSU into the DCDT. Upon the user entering her or his desired selection using the user interface mechanism, the DSU control logic will write that order information to a location reserved for that purpose in IM or in an EMM.

When the user approaches a DDT with her/his DSU, the DCDT will use a sensor mechanism to capture the unique machine-readable identification code of the DSU that may be in the form of an RFID tag. The DSU will use a data transmission mechanism such as BlueTooth™ wireless communications or near-field communications (NFC: high-frequency communications at 13.56 MHz, based on the ISO-14443 and ISO-15693 standards) to send the order data to a wireless receiver in the DCDT. In other embodiments, that data transfer can be effected by a wired communication mechanism such as a data connector. The DSU will then retrieve from its inventory the appropriate EMM that will be loaded into the DSU.

Connecting the DSU to Other Devices

In some embodiments, the DSU will connect to another device and transfer DC to it that may have been modified by emulation software so that the DC it contains can be presented by a foreign device, i.e. one that was not specially designed to be compatible with the DCDS of this invention.

The connection mechanism, in some embodiments, will comprise: a data connection on the DSU; a data cable that can be plugged into that connector; and an adapter that can be attached to the other end of that cable. A variety of adapters will be available, with each adapter having the physical form and data terminals that are similar to those that of a standard memory card or other electronic device that can be inserted into the connector on the foreign device that is designed to receive such a card or device.

The emulation software within the DSU enables the transfer of decrypted or specially encrypted DC to the foreign device in such a way that the device receives that content as if it were data that comes from a memory card or from another electronic device such as a USB key or a USB cable that is normally plugged into that connector.

In some instances, a user of the DSU will want to send DC to, or receive DC from, a personal computer. Some DSU embodiments will be adapted for that purpose by using a data communication method that may be chosen from, for instance: a USB connection; serial data communications; parallel data communications; infrared communications; Ethernet communications; FireWire™ communications; or WiFi communications.

The great popularity of the iPod™ device manufactured by Apple that stores and plays MP3 music as well as video has led to the development and ready availability of a wide range of audio and video players that offer better sound quality and larger display screens than the pocket-sized iPod. The players developed by other manufacturers connect to the iPod via its universal dock connector. One embodiment of the DSU will incorporate an iPod universal dock connector as well as emulation software. When the DSU is connected to such players, digital content provided by the DSU will appear to the player as if it comes from an iPod™.

DSU-to-Cell Phone Communications

Many electronic devices have a built-in wireless communications mechanism such as BlueTooth™, infrared signaling (IrDA), or NFC. A DSU that is equipped with a compatible wireless communications mechanism will be able to conveniently communicate with such a device. An example of a device that may be adapted to receive DC via a wireless data link is a cellular telephone, or a PDA that includes cellular telephone functionality. The DSU may then use BlueTooth™ wireless communications, for example, to send a video clip selected from the DC stored in the DSU to a cell phone that is equipped to play it.

The DSU, using such a wireless connection, can also use a suitably configured and programmed cell phone, or a similarly endowed PDA, to send and receive SMS messages that might, for instance, be an order sent to an order processing means of the DCDS for a special movie that would be transmitted to the DCDT that is nearest the subscriber. Other examples of uses of SMS means is to authorize the transfer of funds from the user's bank account or credit card account to the payment account or electronic wallet to: purchase subscriptions to DC; purchase or rent specific DC; purchase products or services from third-parties that use the DC to promote their businesses; etc.

The DSU may, in a similar way, receive data that may include one or more of the following: payment confirmation; authorization code; unlocking code; decryption key. Such data will allow portions of the DC stored in the DSU, either in an EMM or in IM, to be rendered accessible for use, either on a permanent or temporary basis.

The DSU, in another application, will use such a connection to send a phone number to the cell phone that would then be used to place a desired call. An example of an application that would employ such a facility is to call an advertiser whose video ad has been viewed via the DSU/DCPU.

In a further embodiment, the DSU would, in itself, have wireless telephone functionality, such as a cell phone, WiFi SIP phone, or a dual mode wireless telephone.

Current Industry Initiatives in the Combined Use of a Smart Card with a Cell Phone A preferred embodiment of the DCDS of the present invention will employ near-field communications (NFC) and smart card payment methodologies. To that end, the DSU will incorporate NFC and smart card technology, and the DCDT will incorporate a smart card reader.

The following articles refer to the widespread interest and cooperation by major firms to develop the use of GSM mobile communications as the transport means to facilitate payments for transactions conducted with the help of contactless smart cards that use NFC:

"Momentum Builds Around GSMA's Pay-Buy Mobile Project" published on Apr. 25, 2007, found at http://www.gsmworld.com/news/press_2007/press07_33.shtml; and "GSM Association Aims For Global Point Of Sale Purchases by Mobile Phone", published Feb. 13, 2007, found at http://www.gsmworld.com/news/press_2007/press07_21.shtml StoLPaN ('Store Logistics and Payment with NFC') is the pan-European consortium focusing on the synergistic combination of NFC and mobile communication.

The DCDS of the present invention will be able to benefit from these developments, as, in one preferred embodiment, the DSU itself will be able to function as the contactless smart card that these initiatives use in conjunction with cellular telephones.

Detailed Description of the Receptacle Contained within the DSU that Holds EMMs

Unlike conventional receptacles that receive electronic memory modules, the receptacle that is designed to be incorporated into the DSU and receive the special EMMs that carry the DC used in the DCDS of the present invention provide for the rapid, automated replacement of the EMM or EMMs it holds.

The EMM receptacle is in the form of a passage that extends from one side of the electronic device that incorporates it to the opposite side. The DCDT will use a pushing member that enters the receptacle from one end and causes the ejection of the EMM it contains out the opposite end, with that EMM being thereby pushed into a compartment of the DCDT's EMM storage system.

The receptacle, in one preferred embodiment, uses at least one spring member with a curved, protruding tip to precisely position the EMM. When the EMM is fully installed in the receptacle, the tip sits in a similarly curved indentation in the obverse face of the EMM. As it is being inserted, the EMM initially passes by the protruding tip freely, as the EMM's longitudinal groove provides sufficient clearance until the EMM approaches its fully inserted position at which point the protruding section rides up the slope at the end of the provided groove and comes to rest in the indentation where it exerts sufficient pressure on the EMM to ensure precise positioning and good contact between electrical terminals on the EMM's opposite face and the corresponding set of electrical terminals on the wall of the receptacle.

EMMs can be Locked when in a DSU

A spring-loaded movable locking pin is advantageously disposed in the receptacle to communicate with a notch in the EMM that is held therein. While the DSU is in the DCDT, before the old EMM is ejected and a new EMM is inserted the locking pin is retracted by an electromagnet in the DCDT that attracts it. When the DCDT control computer deactivates the electromagnet, the movable pin, urged by a spring, engages a corresponding notch in the newly installed EMM to prevent its movement.

Receptacles that Contain Multiple EMMs

In some embodiments, the receptacle will be designed to receive and retain more than one electronic module, with the length of those modules being a whole fraction of the length of a single module that would fully occupy the module receptacle. In such an embodiment, one of the inner walls of the receptacle will incorporate one set of electrical contacts for each module that will be therein contained.

Although EMMs in this embodiment can be inserted by the DCDT insertion mechanism as previously described, the EMM ejection mechanism requires an approach quite different from that which the preferred embodiment uses when a single EMM is in a DSU receptacle. That different approach is described in the description of the DCDT.

Off-Loading DC from the DSU—while Still Respecting a DRM Protocol

The DSU, in some embodiments, will be able to transfer the DC it contains at high speed to other devices instead of streaming it as it is played on a DCPU. An example is a DSU-attached mass storage system (DSU-MSS) that may be a stand-alone DSU-MSS that is directly attached or that is at a remote location. In another embodiment, the DSU transfers its DC to an EMM or other form of memory such as a disk drive that is integrated into another device such as a DCPU.

The DC that is transferred may be either encrypted or in a generally readable form. Such transferred content can be presented at a later date, even after the EMM in the DSU from which it was copied has been replaced by another. The DC in the MSS will be communicated for presentation to a DCPU, either directly or via the DSU. If the DC transferred by the DSU is encrypted, and can therefore only be played by a compatible DCPU, and if the copy that was in the DSU has been automatically erased, even after being transferred in this way it may still adhere to a strict "no copying allowed" digital rights management protocol.

Verifying EMM Functionality

The DSU, and, in some embodiments, the DCDT, will include a test function that, by means of the microcontroller, will verify the good functioning of the EMM that will be replaced by the DCDT. The test function may also be used to identify other functional problems in the DSU or DCPU. Unlike previous art, the terminal itself therefore does not have to effect such testing.

Additional Communications Functions

As described above, the operation of the DCDS of this invention will generally have the DSU communicating directly with the DCPU. The DSU or the DCPU it connects to may also communicate either directly or indirectly with the DCDT, the RDCS, and with other computers that contribute to the operation and management of the service.

Detailed Description of the DCDT and its Operation

Overview: Exchange of a New EMM for an Old EMM

As has been previously described, the DCDT will use a pushing member that enters a DSU's EMM receptacle from one end and causes the ejection of the EMM it contains from the opposite end, with that EMM being thereby pushed into a storage compartment or cell of the DCDT's EMM storage and retrieval system (EMM-SRS). In that cell, the EMM will, if required by the anticipated needs of other users who bring their DSUs to that DCDT, receive new digital content that is copied from the mass storage system (MSS) that, in most embodiments, is likewise internal to the DCDT. The MSS will typically comprise hard disk drives in a RAID configuration.

In some instances, the EMM will be returned to inventory in the DCDT without its DC being changed, as would be the case if the DC contained in that EMM is a popular film that others are certain to want.

Providing for Rapid Picking of EMMs from the DCDT's Internal Inventory.

EMMs will be stored in an addressable position in the storage array that is a principle element of the DCDT's EMM storage and retrieval system (EMM-SRS). The EMM-SRS provides for rapid, random-access retrieval of a particular EMM that contains the specific DC that a user who has positioned his DSU in the DCDT has requested. The storage array, together with the EMM handling system and the computerized inventory management and control system, comprise the EMM-SRS.

In the preferred embodiment of this invention, each storage location is a cell substantially the length of an EMM and narrowly rectangular in cross section, enabling an EMM to be contained therein. In the preferred embodiments the many cells are open at both ends and are arranged in a geometrical array.

The storage array in the preferred embodiment herein described is in the form of a multi-layer radial storage array that, in shape, is substantially a drum with a hollow core.

Storage Array Design Criteria

The DCDTs that form the distribution network of an implementation of the DCDS of the present invention are given access through a data communications link to the full collection of DC on single or multiple RDCS.

A DCDT that serves hundreds of users per hour with a large variety of different DC, however, will need a much larger store of EMMs than would be the case for a DCDT in a small town that serves, at most, a few hundred people per day who generally order a very predictable assortment of DC, with the users each picking up their usual kind of DC at predictable hours on predictable days. The DCDT control system will have the capability to detect such patterns of demand to enable it to prepare EMMs in its inventory in advance of anticipated demand.

DCDTs of different storage capacities may therefore be manufactured for use in the DCDS of the present invention, as one context may require the storage of thousands of EMMs while another only needs to have a few hundred on hand.

A large capacity storage array (SA), in one preferred embodiment, is a multi-layer array, with each layer comprising a radial arrangement of cells approximately 40 cm in diameter. Each layer is substantially 1.5 cm in height and comprises substantially 150 cells that radiate from a central empty core 30 cm in diameter, with the cells being open at the circumference or outer "surface" (which is actually comprised of cell openings) of the drum-shaped SA. The 30 layers that comprise that SA configuration will result in a SA that is approximately 45 cm in height, with a total capacity of 4,500 EMMs.

A smaller capacity SA may be 30 cm in diameter, with a 20 cm hollow core. Each layer, in such a configuration, will comprise 80 EMMs in radial cells. A 10-layer array will have a capacity of 800 EMMs.

Another embodiment would comprise multiple two-dimensional arrays of cells, with the arrays being stacked together. One array would be pulled out at a time, and the position of a DSU-holding cradle, as well as extraction and insertion means that move with the movement of that cradle, would be positioned in front of a desired cell by two orthogonal linear displacement mechanisms.

Reducing the Size of the DCDT and its SA

The size of the SA of the preferred configuration may be most easily reduced from the dimensions given above if EMMs are decreased in length and width. The DSUs that will interoperate with the DCDTs and the EMMs they contain must be designed around the size of the EMMs that will be therein contained. A very high density SA can be achieved if the EMMs are also decreased in thickness. The limiting factor in the number of EMMs per layer is the thickness of the ends that are stored towards the center of the array. In embodiments that aim at miniaturizing the DCDT, the thickness of one end of the EMMs may be reduced by a gradual tapering that affects approximately 40% of the EMMs length, leaving sufficient thickness in the remaining portion to accommodate the required electronic components.

The requirement for a hollow core is eliminated if the EMMs are provided with attachment means that would allow the coupling of a module with a cooperating pusher/puller means.

EMM Retention Means

In one preferred embodiment, the EMMs that are stored in individual cells in the SA are each held in position by retaining means in the form of a spring clip that is attached to the end of the SA cell and which grips the EMM by squeezing the opposite faces at the end of the EMM when it is fully inserted.

In another embodiment, the retaining member is positioned on a side wall of the cell. The tip of the side-wall-mounted retaining member presses springably against the EMM only when the EMM is fully inserted into the cell, as there is a longitudinal groove along the face of the EMM that ensures that the tip makes contact with the EMM only at the point when there is a rise in the groove bottom to a crest that is even with the face of the EMM. That crest is followed by an indentation that corresponds in position, once the EMM is fully inserted, to the position of the sidewall-mounted retaining member. The tip of the retaining member that contacts the EMM at that point is in the form of a polished segment of a cylinder that corresponds to the shape of the indentation.

In cells that incorporate electrical terminals, the retaining member may itself be split into a number of terminals that correspond to a similar number of terminals on the EMM that, in this embodiment, will form the inner surface of the indentation.

An alternative embodiment will place the electrical terminals on the opposite face of the EMM where they will be flat in form and even with the surface of that opposite face. In such an embodiment, the corresponding set of terminals on the sidewall of the SA cell will protrude slightly from that wall and will be spring-loaded. The spring retaining member will, in this embodiment, apply sufficient force on the EMM when the EMM is fully loaded to press it firmly against the opposite sidewall, ensuring good electrically conductive contact between the two sets of terminals.

Another Approach to EMM Ejection and Replacement

In another embodiment, one EMM residing in a DSU will be automatically ejected by the insertion of a second EMM into the same receptacle that pushes out the first one. To be fully inserted into the SA cell, the first EMM must be pushed a greater distance than its length.

A pushing tongue is actuated by a servo motor that is coupled by a pinion gear to a rack. The tongue pushes an EMM out of its position in a SA cell and into the receptacle of a DSU. That movement pushes a second EMM that had been contained in the receptacle into the cell of a second storage array.

To enable the first EMM to be pushed by the tongue beyond the EMM's normal resting position in the DSU and then be pulled back so that it is returned to its proper position, an attachment mechanism controllably connects the tip of the tongue to the EMM. One embodiment of the required attachment mechanism is an electromagnet in the tip of the tongue that enables that tip to be controllably and firmly attached to the end of the EMM. The end of the EMM that is contacted by the electromagnet tip is composed of an appropriate ferromagnetic material such as high-silicon steel.

When the Desired DC is Available from the DCDT EMM Inventory

If the DC is already loaded on an EMM that is contained within the DCDT, the user can immediately insert his DSU into the cradle of the DCDT and the appropriate EMM will be inserted within a few seconds, a few seconds after the EMM that had been in the same slot in the DSU has been ejected.

Preparing EMMs for Users Who have been Identified as they Queue Up at a DCDT

In some embodiments and contexts where there may be a queue of people waiting to mount their DSUs in the DCDT cradle to receive new DC, a data sensing station (DSS) some distance away from the DCDT will allow each user to "check in", as the DSS automatically will sense the identity code of the DSU by a data sensor such as an RFID tag reader, by a bi-directional wireless communications mechanism such as NFC or BlueTooth™, or a combination of BlueTooth™ and NFC. Each user will get assigned a position in the queue and have the previously entered DC order data that had been stored in her or his DSU automatically transferred to the DCDT by wireless means. This transfer of data concerning a user's order for DC will enable the DCDT, if required, to specially prepare an EMM with the desired DC, copying that DC from the MSS to an EMM taken from inventory, so that this newly loaded EMM is ready for insertion into that user's DSU when she or he reaches the head of the queue.

In some embodiments, the estimated time of availability of the desired DC in the specified DCDT may be displayed on the DCDT display screen or otherwise communicated to the user. After the order request has been communicated to the DCDT by wireless communications, that user may have to wait a few minutes if an EMM containing a large volume of desired DC must be specially prepared.

In some further embodiments, if the user who has requested that DC is known to be waiting in the queue the DCDT will either send a notification signal to the user's DSU or display the user's ID on a highly visible display screen mounted on the DCDT as soon as the EMM has been prepared with the desired DC. In other instances, the user has communicated his order data ahead of time and by another data communications method, either from home or via a DC ordering terminal.

If the DC that has been ordered by the user is not available on a pre-loaded EMM and is not available from the MSS in that DCDT, there will be a further delay, as the desired DC will have to be communicated to the DCDT by data communications link from a RDCS. Depending on the speed of the communications link that is employed and the amount of DC that has been requested, the delivery of that DC to the DCDT may take anywhere from minutes to a day or more if, as will happen in some countries where the physical delivery of a data storage module will be employed instead of an electronic data communications method.

Offering a Wide Choice of DC to Many People at Rush Hour

A DCDT that must offer a large choice of EMMs to a very large number of users each day, with very heavy traffic at rush hours, as would be the case for DCDTs located in a subway station, will comprise multiple arrays in a single DCDT, with each array serving a different user position and each user position having a cradle to receive a DSU. As the users check in at a DSS a few meters from the DCDT, they wait in a queue as they might do in a bank. Their own ID or nickname will appear in a list on a display above the user position that is served by the array that has the DC that they have ordered. When a user's name appears at the top of a list, it is her or his turn to be served by the DCDT at the indicated position.

Accepting DSUs for DC Update: a Different Mode of DC Delivery

To accommodate users who may want to acquire a small volume of DC, one embodiment of the DCDT will include at least one "update mode" cradle, either on a different side of the DCDT or at a nearby ancillary small terminal that communicates with the DCDT. In this mode, DC will be copied by wireless means such as irDA to the DSU where it will be stored in IM or to in a specific location on an EMM within the DSU.

Internal Clock

The DCDT may have an internal clock to update the internal date/time stored in the DSU.

The DCDT can write one or more date/time (D/T) codes to an EMM before installing it in a DSU. Such codes can include: the D/T when the EMM is installed; the D/T when the DC it contains can first be accessed; the D/T when the DC it contains can no longer be accessed.

Digital Content Ordering and Payment Means
Various Methods can be Used to Order DC The user will use an ordering system to order desired DC.

In some contexts and embodiments, submitting an order for DC will entail interaction with an order-processing server (OPS). Some of the communication methods that may be employed to provide interaction with an OPS are: a DCDT equipped with additional functionality for that purpose; a different kind of terminal such as a PAT that has been adapted to provide such an ordering service; a telephone call to an interactive voice response system; an SMS message sent to the ordering system by a cell phone; a website that is accessed via the Internet; or via another computer-based data entry and communications method.

As an example of what may be required from a user when placing an order, the user may have to provide some or all of the following: an identity code; a password; the product code of the DC or other type of product or service that is desired; the date when wanted; if this is a rental or pay-for-use transaction, how long the DC will be used or how many times it will be played; preferred payment means; order confirmation code; the location of the DCDT where the user wants to receive the DC (if this will not be the most conveniently located DCDT that he or she normally uses and is identified in the user's account profile).

The user may use similar communication methods to consult an indexed list of available DC, with that list being maintained by the OPS or by a separate DC directory server.

A specially designed, stand-alone DC ordering terminal may be added to the DCDS of the present invention. That ordering function may also be incorporated into the PAT.

Payment Confirmation Methods

Before loading the EMM into the user's DSU, the DCDT may, in some embodiments and under certain conditions, communicate with a central user account management server to verify the status of the user's account and his right to receive the selected DC, which, in some cases, is dependent upon the reception of a required payment or having sufficient funds within a payment account to make that payment.

Some DC Will be Free

Although the acquisition of some forms of DC will require payment, as will the products and services that are ordered from companies that advertise in the media distributed by the DCDS, some forms of DC will be available at no charge. Some examples of such DC includes free newspapers that are advertiser-supported and product and service catalogs. The enterprise that operates the DCDS (DCDS-Ent) and distributes such free DC will earn revenue from commissions on products and services that are ordered via the DCDS from such advertisers, using the same ordering means that are used to order DC.

Contactless Smart Card Functionality and Micro-Payments

One preferred payment method uses a DSU that functions as a contactless smart card to automate individual payments for DC or other goods and services.

This includes "micro-payments" that may be debited from the payment account when a single song is purchased from the library of music that is already contained within an EMM in the user's DSU. Once payment has been made, codes will be communicated to the DSU allowing that song it to be decrypted and played, or transferred from an EMM to IM.

Recharging the Payment Account: Standard Method

One method that will most often be used to add funds to the payment account will be a conventional automated payment means such a credit card or debit card terminal that may be integrated into the DCDT and PAT. Some forms of PAT will be stand-alone units in locations where no DCDT is installed, requiring such PATs to have their own data communications mechanism to communicate with the UAMS.

Other Ways that can be Used to Load Funds into the User's Payment Account

If the user has access to the Internet, such refill payments may be effected using the methods that are well known and widely used, such as: by credit card through a secure website; via an online payment service such as PayPal™; communication by telephone to an interactive voice response (IVR system); through an ATM, with the DCDS-Ent having made the necessary arrangements with banks.

Enabling Users to Refill their Payment Accounts Via Cash Payments

In locations where automated payment means is not practical and where many have neither credit cards nor bank accounts, alternative payment means may be used such as the use of retail stores as intermediaries who will accept payments. Participating retail store owners will confirm payments and forward money received on a regular basis, less a commission and/or transaction fees, to the operators of the DC delivery service. In some cases, the retailer will have a DCDT located in his store.

The person who receives cash from a DCDS user at a retail store (or at other premises where a DCDT is installed) may confirm such a payment by using a payment acceptance terminal (PAT) near the cash register. In some embodiments, the PAT will communicate with the in-store DCDT, with the DCDT relaying communications to the centralized user account management server (UAMS) so that the funds that have been received are immediately reflected in the user's payment account.

The retailer will forward the funds, identified by reference to the user's account ID, to the DCDS-Ent using electronic funds transfer, or by other means that are most practical in that location. The DCDT or PAT in the store may provide added value and revenue to the retailer by means of other functions such as surveillance (via a built-in security camera), the issuing of calling cards whose purchase earns the store owner a commission, the distribution of discount and promotional coupons, etc.

Communications

The DCDT may be provided with data communications means (via data connector, IrDA communications, or wireless communications means such as BlueTooth™ or NFC that is compatible with similar means incorporated into the DSU.

The DSU, in some embodiments, will likewise use wireless data communications means such as BlueTooth™, NFC or a combination of the two to communicate directly with a PAT.

The DSU will communicate with the DCDT to order DC, and the DCDT will communicate with the DSU to confirm the order and the payment made from the user's payment account.

Purchasing DC that Requires the Loading by a DCDT of a New EMM into the User's DSU One application for such communication will be to authorize the transfer of funds from a user's credit card or bank account to his payment account. The availability of funds will be confirmed either by storing account data in the DSU or in the DCDT/PAT, or by having the DCDT/PAT communicate in real time, via fixed or wireless communications means, with a central user account management server (UAMS) that will, in turn, communicate as required with the user's financial institution or a payment service to authorize, accept and confirm payments using methods that are as is well known to the art.

A different mode of payment for DC is an automatic periodic payment for the purchase or rental of DC that is included in a user subscription. Some examples of DC subscriptions: a daily newspaper; a monthly magazine; two movies rented each week.

The Purchase or Rental of Content that is Already Stored in a User's DSU

In some cases, specific DC that is desired by the user may be chosen by the user from a library of such content that is stored in an EMM that has been previously loaded into the DSU. The payment for that specific DC will debit the user's payment account. Once that payment has been confirmed following communication by the DCDT/PAT with the UAMS, the DSU will receive at least one authorization code and a content code that will instruct the DSU to transfer that content from the EMM to the DSU's IM or to a DCPU so that it can be presented, decrypting the DC if that is required, so that the DC may be played or presented either from the DSU itself or from the DCPU with which the DSU communicates.

Capturing Data Describing User Activity

Some examples of the many potential uses of user-activity data that can be gathered and stored in the DSU are: content selection; product ordering; contest submissions; consumer surveys. In some embodiments, the DCDT will read "usage tracking data" captured on the EMM that is automatically generated by the DSU or the DCPU as the user makes use of the DC.

The DCDT will read data of the kinds described above from an EMM that the DCDT has removed from a DSU during the EMM replacement process. The data is read while the EMM is in a SA cell that is equipped with electrical contact terminals that also enable the EMM to be loaded with fresh DC. In some embodiments and conditions, before that DC is loaded, or before the EMM is left in the cell without changing its content—the DCDT control computer will connect to the EMM and read the collected user data it contains.

DC Ordering Function and Payment Integrated into the DCDT

In some embodiments, the user can select the DC he or she desires by using an interactive interface, such as a display screen and user input mechanisms, that is integral to the DCDT. In some embodiments, the interface can be utilized by one user standing at one side of the DCDT while a second user receives DC in her or his DSU at the other side of the DCDT.

A magnetic strip card reader, in one preferred embodiment, will be integrated into the DCDT (and will be standard equipment on the PAT) to allow users to use a credit card or debit card to add funds to their payment accounts Interaction Between the Network of DCDTs and the DCDS Servers Where the DCDT Gets its DC In an urban environment, the implementation of a DCDS will see DCDTs deployed district-by-district, so that within a short time users everywhere in the city will have easy access to such a terminal. The content that is stored in the MSS within the DCDT, and that is copied to the EMMs that are removed from DSUs as they are replaced with new EMMs, will be communicated to the DCDT from one or more remote digital content servers (RDCS) by direct or indirect wired or wireless data communications link. (Indirect means will employ an intermediate data relay unit that relays data communications between one or more DCDTs and the RCDS.) In environments where such electronic data communications links are either unavailable or too costly, delivery of the DC can be effected by the plugging in of a portable data storage module that is physically delivered to the DCDT location. In such an embodiment and service implementation, the DC in the portable data module will necessarily be encrypted.

Communications Between Different DCDS Elements:
DSU, DCPU, DCDT, DSS, PAT, and the Various Servers Wired or wireless communication methods will be used to transmit user-originated data and DSU- or DCPU-generated data from the DCDTs and to the various servers that manage system activities and deliver DC. The different DSU embodiments will also communicate with a variety of PEDs. An appropriate wireless communications method will be chosen for each of the different links where wireless communications is called for, as each link has different requirements. The methods to choose from include: Bluetooth™ Wireless Technology; Certified Wireless USB; HiperLAN; HIPERMAN; Infrared (IrDA); Near Field Communication (NFC); Near-Field Magnetic Communication; Ultra-Wideband (UWB); WiBro (Wireless Broadband); Wi-Fi (IEEE 802.11); WiMAX (Worldwide Interoperability for Microwave Access and IEEE 802.16); ZigBee (IEEE 802.15.4); 802.20.

The remote digital content server (RDCS) will receive DC from, and communicate audible usage data to, the digital content publishers' servers (DCPSs). The RDCS delivers DC to the DCDTs where it is stored on the internal MSS. The RDCS will also function as a DCDT management server, keeping track of parameters that track DCDT usage and traffic patterns, the need to restock a DCDT as defective EMMs are removed from inventor, any error messages or alarms that are generated.

Data concerning which EMMs have been loaded into each user's DSU will be sent by each DCDT to the user account management server (UAMS). Data will also flow in the other direction, from the UAMS to the DCDTs, to communicate information for each user who regularly uses that DCDT concerning account status and the amount of funds available in their payment accounts.

The UAMS will manage: user subscriptions to specific DC; user profiles, preferences and configuration data; orders for special content placed by the users; the acceptance of payments that are associated with such services and transactions; etc.

In some embodiments, the DSU itself (or a combined DSU-DCPU) will have built-in wired or wireless communications means to enable it to communicate directly or indirectly with the RDCS.

In other embodiments, the DSU will communicate indirectly, sending and receiving data via another device that employs a wired or wireless telecommunications connection to relay data between the DSU and the RDCS. Two examples of such relayed communication are: DTMF tones generated by the DSU that are sent to the RDCS via a telephone call made by a wired or wireless telephone; SMS messaging that is sent via a computer or cellular telephone.

One preferred embodiment that will include the use of cellular telephones as indirect means to act as communication channels used to facilitate the ordering of DC and the making of payments uses NFC, as previously described in the description of special DSU functionality.

For some categories of user data capture that do not have to be communicated in real time, such as ordering DC from home for pick-up at the DCDT later, a simple approach can be used that does not require any communication means in the DSU or DCPU. The user will instead interact with the servers that manage the service via a telephone call to an interactive voice response system (IVR), a call center, or via the Internet. For this purpose, a normal voice line or a dial-up connection to the Internet will be sufficient.

In the case of applications in which the user updates the DC very frequently, as will be the case, for example, with subscriptions to daily newspapers, user-originated data (along with user usage data that is automatically generated as the user interacts with the DC) may be transferred to the DCDT when the DCDT reads that data from the EMM, or via short-range communication means such as IrDA, BlueTooth™ or NFC that is employed between the DSU and the DCDT. The DCDT would then use its own communication link to transfer such data to the appropriate DCDS computer server. Data that can usefully be captured and communicated in this way includes orders by the user for products and services from third-party enterprises that advertise in the media that are distributed by the DCDS.

Special Security Measures
Enhanced User Identification

In some preferred embodiments, enhanced security will be provided by a user identification mechanism that will prevent an unauthorized person from using a DSU. In such an embodiment, before the DCDT inserts an EMM into a DSU that has been placed into its cradle, the DCDT will require presentation by the user of a card, key-tag, or other object bearing a machine-readable identification code that contains the user's ID in the form of an RFID tag. If such an identification check does not confirm that the person who brought the DSU is its rightful owner (or someone who may have been given the owner's identification means), the DSU will not be released from the DCDT but will, instead, be transferred to a holding bin.

Theft-Resistant User ID

Cards or ID tags can be lost or stolen. The DSU, in some embodiments, will incorporate a substantially theft-resistant user identification method. The simplest such methods may require the user to enter a user name and password on a data-entry device on the DCDT, or voice a spoken secret phrase that will be recognized by speech recognition means in the DCDT, comparing the spoken words to a secret phrase stored in the user profile.

Yet another embodiment, one intended for high security applications, will incorporate biometric user identification methods such as a fingerprint scanner built into the DSU, the DCDT, or into a payment acceptance terminal (PAT) of the kind described below.

If the biometric identification system is incorporated into a DCDT or PAT, the choice of appropriate methods may also include: iris scan; face recognition; speaker recognition; hand geometry. The parameters that are computed from the data gathered by the biometric sensor module must match similar parameters that are stored either in the DSU or, in other embodiments, in the DCDT, PAT, or in a remote server that can be accessed by the DCDT or PAT in real time.

Data Encryption

The DCDT or the DCS will, in some embodiments, be able to encrypt the data copied to the EMM so that it can only be read by the DSU that receives it. Such a process will require the user to either pre-order such a specially prepared EMM or wait at the terminal for the time it takes to prepare it. In some embodiments, the DCDT control computer will use an encryption algorithm to encrypt a specific category of content so that only compatible DCPUs can decode such content. In other contexts, the DCDT will either employ an encryption key that is stored in the user's account profile, or obtain that key from the DSU while it is the cradle of the DCDT by wireless or other communication means.

A DSU that delivers DC to a DCPU may, in some embodiments, also communicate a key or other decryption means that the DCPU will employ to render the DC usable.

Digital Watermarks

Techniques are well known to the DC security art that encode a difficult to detect pattern in the DC. Such techniques will be employed in some embodiments of the DCDS of the present invention to be able to identify DC that has been illegally copied.

Marking an EMM with a DSU's Unique Code

The DCDT can write a unique code on an EMM, either in a particular memory location or as a digital watermark within the DC, before installing the EMM in a DSU. That code will correspond to a code known to software within the DSU that must be recognized by the DSU before it can read the DC stored in the EMM. With the use of this method, the DC will not be accessible if an EMM is transferred to another PED or if its contents are copied to another EMM for use in another PED. (This step will not add any time to the EMM replacement process, as this is not user data that is being written.)

Stolen DSUs and a Security Camera in the DCDT

The DCDT, in some embodiments, will photograph anyone who inserts a DSU device into a DCDT. If someone inserts a DSU that has been reported as stolen, the DCDT will not release the DSU and will create a security report that includes the photo of the person who possessed the stolen DSU.

If the DCDT is proximate to the entrance to the store where it is located, or near the cash, such security camera means can photograph everyone who approaches, enabling the DCDT to provide added value to the provider of space for the DCDT. Wireless video cameras placed elsewhere in the store can communicate with the DCDT's security system to provide full store security monitoring.

Advantages

From the description above, which has gone into considerable detail about the many ramifications that follow from the special features of the digital content distribution system we have invented, a number of advantages become evident:

(a) The use of memory modules that can work only in the data storage units we have designed and whose possible use can readily be restricted to the digital storage unit of the person who has paid for that content, provides a measure of security that will benefit both the owners of such content and its consumers.

(b) The use of an intermediate device such as our purpose-built data storage unit that receives encrypted digital content in memory modules designed for it, and that can, in turn, deliver that content by connecting to a wide variety of popular devices, including those that may have no memory storage capacity themselves, provides a digital content distribution that is more flexible and adaptable than the known art. The same DSU can deliver: audio and video to an existing home theatre system or to a portable video player or music player; text to a portable electronic book; and games to a video game system. This, without users having to consider which electronic modules to buy. They never have to deal with memory modules.

(c) The design and operation of the DCDT of this invention that handles one format of memory module is much simpler than machines that must deliver an assortment of formats of electronic modules. Such a vending machine may provide, say, three different module storage magazines, all three with the same popular DC such as a current film, but each holding a different format of memory module. The number of different discrete storage areas required would be very large, and it would be excessively difficult to design of a random-access system that could handle standard memory modules of different geometry and with different placement of electrical contacts.

(d) All other known art that distributes DC via memory modules must use a unique ID stored in the memory of each module to keep track of usage. Some previous art specifies that its methods require that user data and other data must be written to, and read from, the memory modules. This takes time, and constrains how many people can be accommodated per hour. To keep track of the history of a memory module and where it is at any moment, our invention requires neither a unique code on the memory modules nor the reading and writing of data from and to them. A virtual serial number (or the one printed on it) is associated with an EMM when it enters service. Due to the use of a random access method of handling the EMMs and the use of a machine-readable ID code on the DSUs (instead of on the EMMs), the system can keep track of the whereabouts and history of each EMM.

(e) The use of the DSU means that only the DCDT only has to read the DSU identity to know who the user is. There is no need to read user information from the EMM that is recuperated, or write user information to the EMM that is dispensed.

(f) In some embodiments, user information about orders to be filled, usage, etc. will only be maintained on the UAMS. No information has to be read from, and written to the DSU.

(g) Because our digital content distribution does not require a high-speed connection to the Internet, it can bring the benefits of a vast choice of digital content to people in virtually every country.

(h) Only a system like ours that can deliver up to 48 GB of digital content to a consumer in a few seconds can be used to distribute feature films in HDTV format to large numbers of people in high-traffic areas such as subway stations. At the same time, those consumers can also receive their daily newspapers.

(i) Only a digital content delivery system like ours that completely eliminates the manufacture, distribution and merchandising of physical media containing specific content can have operating cost that are so low that it can be used to deliver the "free" newspapers, catalogs, an advertising catalogs and packs of flyers that deplete our forests, litter our subways, streets and building entrances, and clog our refuse collection services.

(j) Only a system like ours whose dispensing terminals can offer thousands of choices of immediately available digital content, with many times that number being available within a few minutes of waiting time, can offer content that is only of interest to people in a particular neighborhood, or to people whose interests are unlike those of most other people.

(k) Only an organization that operates a digital content distribution service that is based on a system like ours, whose operating costs are so low, can offer, for a token fee or even for free, very desirable non-commercial content such as community-produced video programming or educational multimedia materials that can facilitate both improved schooling and self-directed education.

Although this invention has been described and illustrated in detail with reference to certain illustrative embodiments, these specificities should not be considered as representing the only possible implementations and embodiments of the basic method and system of digital content distribution that underlies them. Variations and modifications can be elaborated to suit conditions in different countries and to answer the specific distribution requirements of different kinds of digital content in specific markets. Many such variations and modifications exist within the scope and spirit of the invention as described and defined in the claims that have been made for it. Those claims should solely determine the scope of the invention.

The invention claimed is:

1. A digital content delivery system for the delivery of memory modules containing a selection of digital content to portable electronic devices comprising:
  a) a plurality of memory modules, each module having a plurality of input/output channels;
  b) a plurality of portable electronic devices, each device comprising:
    i. at least one receptacle designed to receive said memory module wherein said receptacle has at least one opening that permits the module to be slidingly inserted and ejected;
    ii. a machine-readable identity code;
    iii. at least one data output mechanism;
  c) a plurality of memory module dispensing terminals, each comprising:
    i. means to receive and position one said portable electronic device;
    ii. at least one storage array with a plurality of cells that can each contain one module;
    iii. a first controllable displacement means whereby the relative positions of said storage array and said receiving and positioning means can be adjusted so that the opening of one of said cells is apposite to the opening of a known receptacle in the device;
    iv. a second controllable displacement means whereby a module contained within the receptacle can be displaced so that it moves out of the receptacle and into the apposite cell.

2. The digital content delivery system of claim 1 wherein said means to receive and position one said portable electronic device is a cradle.

3. The digital content delivery system of claim 1 wherein said second controllable displacement means is a servo motor.

4. The digital content delivery system of claim 1 wherein said second controllable servomotor displacement means incorporates module attachment means whereby a module contained within a cell can be pulled out of the cell and into the apposite receptacle.

5. The digital content delivery system of claim 1 wherein the receptacle of the device has openings at each of its ends.

6. The digital content delivery system of claim 5 which further comprises a third controllable servo motor displacement means whereby a module contained within one of the cells can be linearly displaced so that it moves out of the cell and into the apposite receptacle.

7. The digital content delivery system of claim 6 which further comprises a fourth controllable servo motor displacement means whereby the position of the cradle in the terminal can be finely adjusted to align a second receptacle in the device with the apposite cell.

8. The digital content delivery system of claim 6 wherein the device further comprises:
  a) at least one device-state indicator;
  b) a microcontroller IC with associated semiconductor memory to hold programmed instructions and data;
  c) at least one user interface mechanism;
  d) at least one data input mechanism.

9. The digital content delivery system of claim 8 wherein the device further comprises a contactless smart card mechanism and a near-field communications mechanism.

10. The digital content delivery system of claim 1 which further comprises:
  a) a lockable cover means in the device whereby said at least one opening in said at least one receptacle is normally sealed by said lockable cover means to render inaccessible said memory module therein contained;
  b) a cover unlocking means provided in said cradle whereby said memory module is rendered accessible only when said device is received in said cradle.

11. A digital content distribution system comprising:
  a) a plurality of digital content dispensing terminals that are each provided with a random access means of storing and retrieving a plurality of memory modules, and the means to automatically install at least one desired module in a portable electronic device that is mounted in one of said terminals;
  b) at least one computer server providing the functions of:
    i. central service control and management;
    ii. order processing;
    iii. user account management;
    iv. digital contents directory
    v. digital contents provision to the dispensing terminals;
    vi. publisher payments management.
  c) at least one data communications mechanism to provide data communications between the terminals and the servers;
  d) at least one data communications mechanism to connect said computer server to at least one digital content server operated by a content publisher;
  e) at least one data communications mechanism to connect said computer server to at least one server operated by a financial services provider.

12. A method of delivering digital content to a portable electronic device, comprising:
  a) preparing an inventory of memory modules that are each loaded with binary-encoded files that may include audio, video, text, video games and other digital content than can be played on entertainment and educational devices;
  b) storing said inventory in a random-access storage array within a dispensing terminal;
  c) providing to each of a plurality of customers a digital storage device that can be mounted in the terminal, with the device having a unique machine-readable identity code and at least one receptacle that can hold at least one of said memory modules;
d) providing said customers with access to digital content directory browsing means and digital content ordering means;
e) accepting a device mounted by one of said customers in a device-holding means in the terminal and reading the code;
f) inserting, by automatic means incorporated into the terminal, at least one second module into the at least one receptacle in the device after the terminal has extracted at least one first module from at least one receptacle, with said second module containing digital content that has been ordered by said customer.

* * * * *